United States Patent
Guey et al.

(10) Patent No.: US 9,872,332 B2
(45) Date of Patent: Jan. 16, 2018

(54) ENERGY EFFICIENT OPERATION FOR WIRELESS ACCESS NODES IN A LOW-LOAD SERVICE AREA WITHIN A DENSE DEPLOYMENT OF WIRELESS ACCESS NODES

(71) Applicant: Telefonaktiebolaget L M Ericsson (publ), Stockholm (SE)

(72) Inventors: Jiann-Ching Guey, Hsinchu (TW); Kumar Balachandran, Pleasanton, CA (US); Dennis Hui, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 490 days.

(21) Appl. No.: 13/627,009

(22) Filed: Sep. 26, 2012

(65) Prior Publication Data

US 2013/0128788 A1    May 23, 2013

Related U.S. Application Data

(63) Continuation-in-part of application No. 13/202,767, filed on Nov. 22, 2011.

(51) Int. Cl.
| | | |
|---|---|---|
| G08C 17/00 | (2006.01) | |
| H04W 76/04 | (2009.01) | |
| H04W 52/02 | (2009.01) | |

(52) U.S. Cl.
CPC ..... H04W 76/048 (2013.01); H04W 52/0206 (2013.01); Y02B 60/50 (2013.01)

(58) Field of Classification Search
CPC ........... H04W 76/048; H04W 52/0206; H04W 52/02; Y02B 60/50

(Continued)

(56) References Cited

U.S. PATENT DOCUMENTS

| 8,520,575 B2 | 8/2013 | Doppler et al. |
| 8,576,760 B2 | 11/2013 | Gorokhov et al. |

(Continued)

FOREIGN PATENT DOCUMENTS

| EP | 2362697 A1 | 8/2011 |
| WO | 2011025295 A2 | 3/2011 |
| WO | 2011055437 A1 | 5/2011 |

OTHER PUBLICATIONS

Non-Final Office Action for U.S. Appl. No. 13/302,767, dated Dec. 4, 2013, 11 pages.

(Continued)

*Primary Examiner* — Kay Yuen
(74) *Attorney, Agent, or Firm* — Withrow & Terranova, PLLC

(57) ABSTRACT

Systems and methods are disclosed for efficient operation of wireless access nodes in a dense deployment of wireless access nodes in a cellular communication network. In general, the dense deployment of wireless access nodes includes multiple wireless access nodes in a service area. The service area is preferably, but not necessarily, a low-load service area. As used herein, a low-load service area is an area within an overall service area of the dense deployment of wireless access nodes in which all wireless access nodes are not needed to provide a desired data capacity. Overlapping radio coverage areas of the wireless access nodes in, or serving, the service area are leveraged to enable efficient operation of the wireless access nodes in the service area.

25 Claims, 32 Drawing Sheets

(58) Field of Classification Search
USPC .......................................... 370/311, 329, 338
See application file for complete search history.

(56) References Cited

U.S. PATENT DOCUMENTS

| | | | |
|---|---|---|---|
| 2008/0293426 A1* | 11/2008 | Kim | H04W 52/0216 455/450 |
| 2010/0048209 A1* | 2/2010 | Aoyama et al. | 455/435.2 |
| 2010/0067421 A1 | 3/2010 | Gorokhov et al. | |
| 2010/0087197 A1* | 4/2010 | Iwamura | H04J 11/0086 455/436 |
| 2010/0220621 A1* | 9/2010 | Li | H04W 52/0216 370/252 |
| 2011/0051640 A1 | 3/2011 | Ramesh et al. | |
| 2011/0170420 A1 | 7/2011 | Xi et al. | |
| 2012/0115471 A1 | 5/2012 | Awoniyi et al. | |
| 2013/0137432 A1* | 5/2013 | Wong | H04W 60/04 455/436 |
| 2013/0150018 A1* | 6/2013 | Su | H04B 1/0067 455/419 |
| 2013/0286848 A1* | 10/2013 | Xu | H04W 52/0225 370/241 |
| 2015/0029920 A1* | 1/2015 | Hoehne | H04W 76/048 370/311 |

OTHER PUBLICATIONS

Olsson et al., "SAE and the evolved packet core: driving the mobile broadband revolution," Academic Press, First Edition, Oct. 7, 2009, pp. 29-31, http://www.3gpp.org/ftp/Specs/html-info/36305.htm.

3GPP TS 36.355, "3rd Generation Partnership Project; Technical Specification Group Radio Access Network; Evolved Universal Terrestrial Radio Access Network (E-UTRAN); LTE Positioning Protocol (LPP) (Release 10)," V10.2.0., Nov. 2006, 114 pages.

3GPP TS 36.305, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10)," V 10.2.0., Nov. 2006, 51 pages.

International Search Report and Written Opinion for PCT/IB2012/056550, dated Aug. 12, 2013, 15 pages.

International Preliminary Report on Patentability for PCT/IB2012/056550 dated Feb. 7, 2014, 9 pages.

International Search Report and Written Opinion for PCT/IB2013/058678 dated Feb. 10, 2014, 10 pages.

Final Office Action for U.S. Appl. No. 13/302,767, dated Jul. 11, 2014, 14 pages.

* cited by examiner

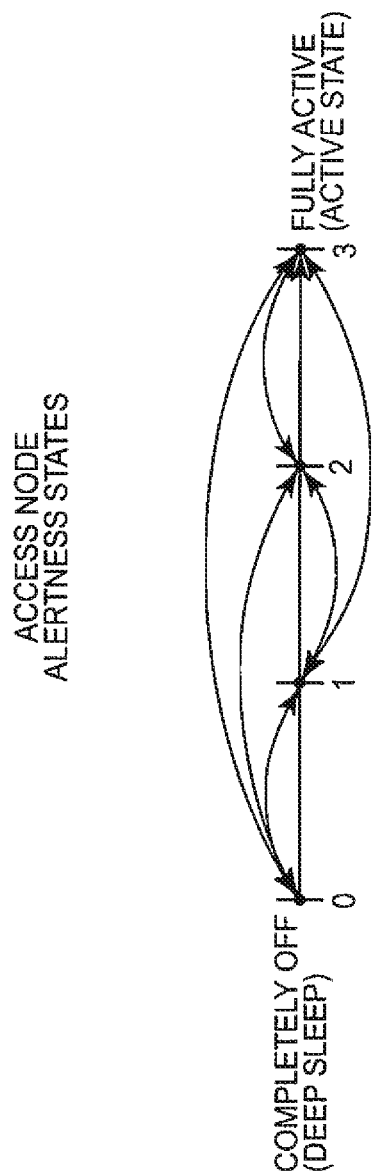

SUBSET 3

☐ ALERTNESS STATE 0 (COMPLETELY OFF)
▨ INTERMEDIATE ALERTNESS STATE

ENERGY EFFICIENT OPERATION FOR WIRELESS ACCESS NODES IN A LOW-LOAD SERVICE AREA WITHIN A DENSE DEPLOYMENT OF WIRELESS ACCESS NODES

RELATED APPLICATION

The application is a continuation-in-part of U.S. Pat. No. 13/302,767, filed Nov. 22, 2011, now U.S. Pat. No. 9,014,070, the contents of which are hereby incorporated by reference.

FIELD OF THE DISCLOSURE

The present disclosure relates to cellular communication networks, and more particularly relates to wireless access nodes in a dense deployment of wireless access nodes in a cellular communication network.

BACKGROUND

In conventional cellular communication networks, a coverage area, or cell, of each base station, or wireless access node, typically covers a large geographic area serving hundreds of user equipment devices (UEs). At any given moment, tens of those UEs may be actively receiving or transmitting data. However, these conventional cellular communication networks are struggling to meet, and in some cases are unable to meet, demands placed on them by the increasing number of mobile broadband subscribers and the ever increasing demand for higher data rates. One viable solution, and possibly the only viable solution, to meet these demands is deploying more base stations.

Recently, a super dense network has been proposed as an architecture for increasing the density of base stations in a cellular communication network. As used herein, a super dense network is a wireless access node deployment wherein on average each wireless access node serves less than one active UE. Because of the low user activity per wireless access node, inter-cell interference is substantially less than that in conventional cellular communication networks and can therefore be more effectively managed. However, low user activity also implies under utilization of the wireless access nodes, which is a scenario unforeseen in the design of conventional cellular communication networks. This under utilization of the wireless access nodes results in excess power consumption by the wireless access nodes.

What is desired is systems and methods that further improve the efficiency of the wireless access nodes in a dense deployment of wireless access nodes.

SUMMARY

Systems and methods are disclosed for efficient operation of wireless access nodes in a dense deployment of wireless access nodes in a cellular communication network. In general, the dense deployment of wireless access nodes includes multiple wireless access nodes in a service area. The service area is preferably, but not necessarily, a low-load service area. As used herein, a low-load service area is an area within an overall service area of the dense deployment of wireless access nodes in which all wireless access nodes are not needed to provide a desired data capacity. Overlapping radio coverage areas of the wireless access nodes in, or serving, the service area are leveraged to enable efficient operation of the wireless access nodes in the service area.

In one embodiment, the wireless access nodes in the service area are configured such that only a subset of the wireless access nodes are active for each of a number of discontinuous transmit active intervals for the service area and only a subset of the wireless access nodes are active for each of a number of discontinuous receive active intervals for the service area. Preferably, for each discontinuous transmit active interval, the radio coverage areas of the wireless access nodes in the subset of wireless nodes that are active for the discontinuous transmit active interval provide radio coverage for an entirety of the service area. Likewise, for each discontinuous receive active interval, the radio coverage areas of the wireless access nodes in the subset of wireless access nodes that are active for the discontinuous receive active interval provide radio coverage for an entirety of the service area. In this manner, basic services can be provided to the service area using only a subset of the wireless access nodes in the service area for any given discontinuous transmit or receive active interval. As a result, efficient operation of the wireless access nodes in the service area is provided.

In one embodiment, the same subset of the wireless access nodes is active for all of the discontinuous transmit active intervals for the service area. Likewise, the same subset of the wireless access nodes is active for all of the discontinuous receive active intervals for the service area. In another embodiment, different subsets of the wireless access nodes are active for different discontinuous transmit active intervals. Likewise, different subsets of the wireless access nodes are active for different discontinuous receive active intervals.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 3 illustrates exemplary alertness states for the wireless access nodes in the super dense network of FIG. 1 according to one embodiment of the present disclosure;

Figure 20:
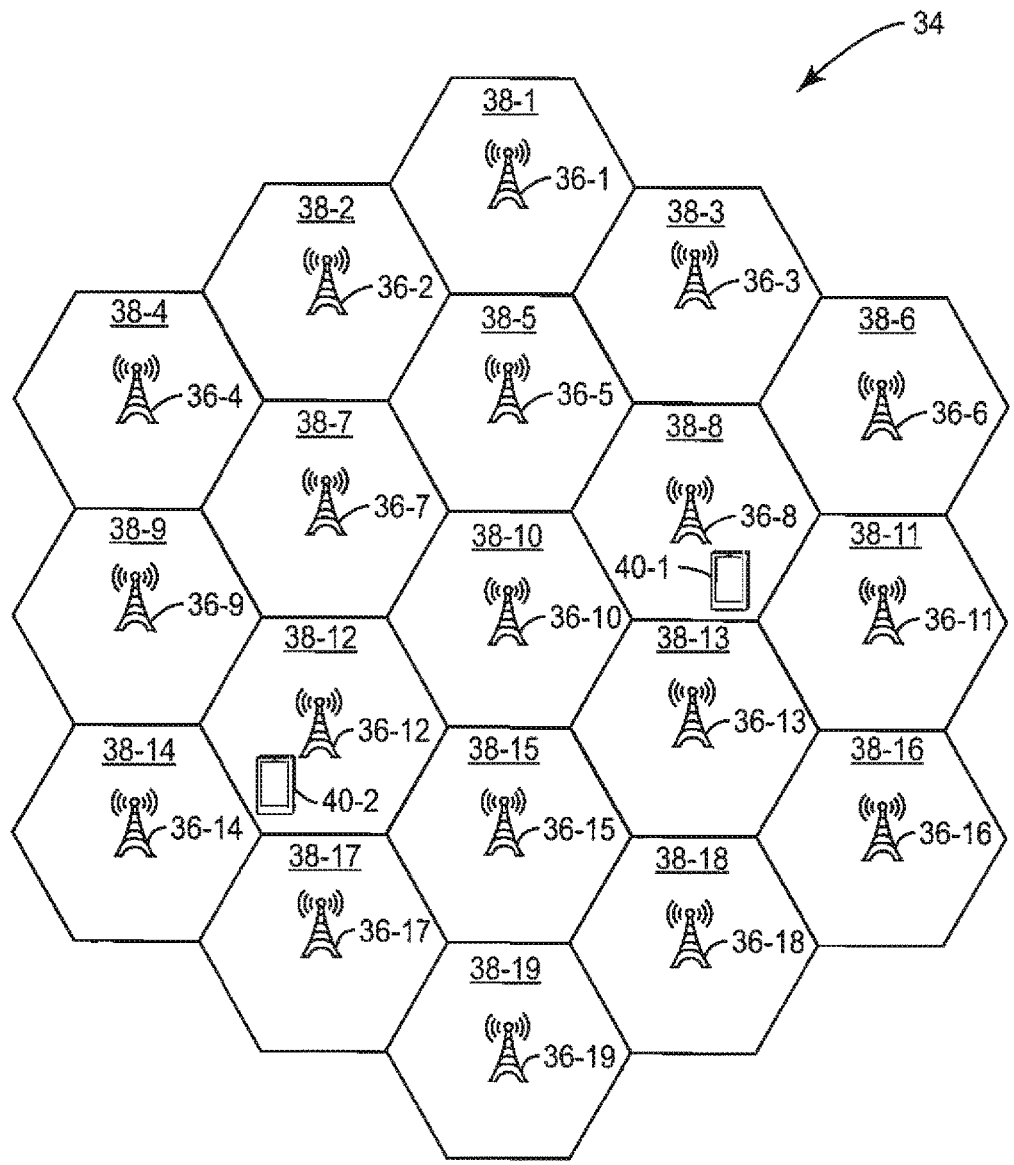
FIG. 20 illustrates a low-load service area according to one embodiment of the present disclosure.
Figure 21:
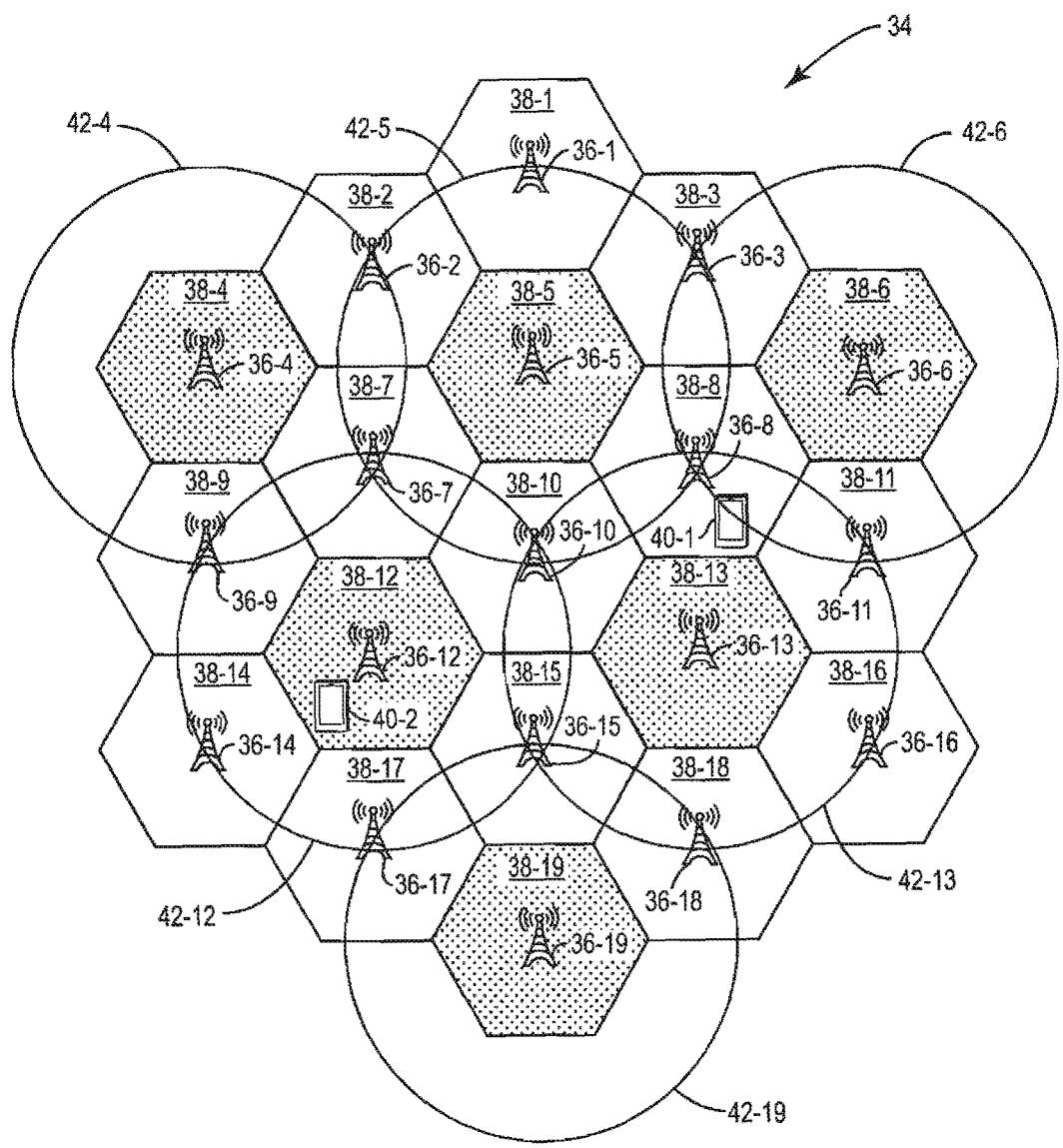
Figure 22:
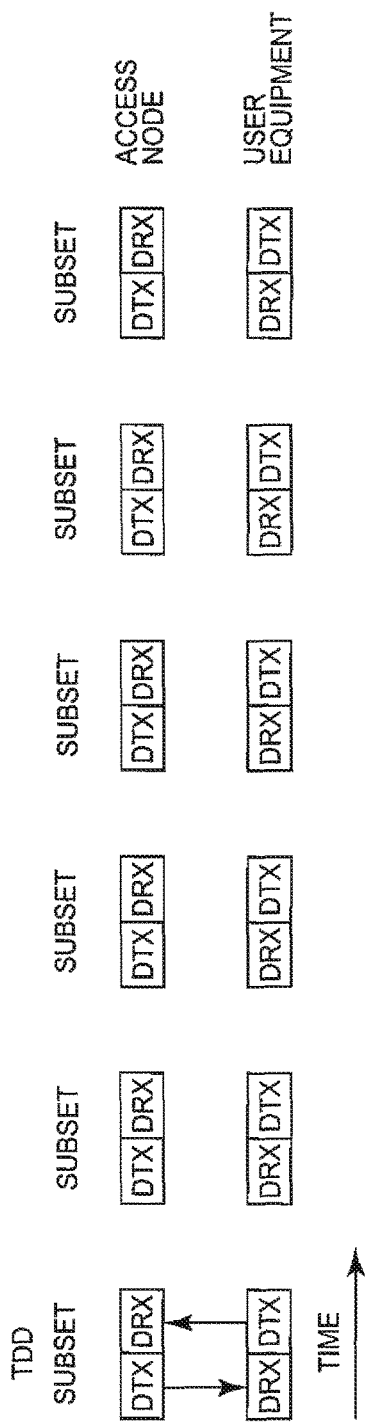
Figure 23:
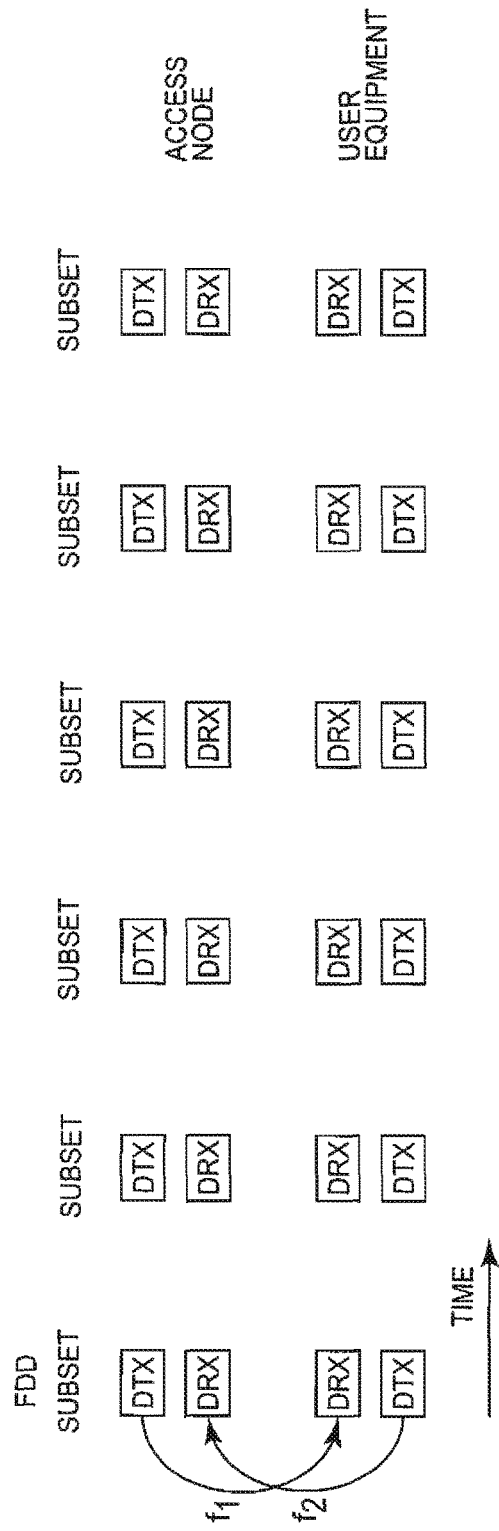
Figure 24A:
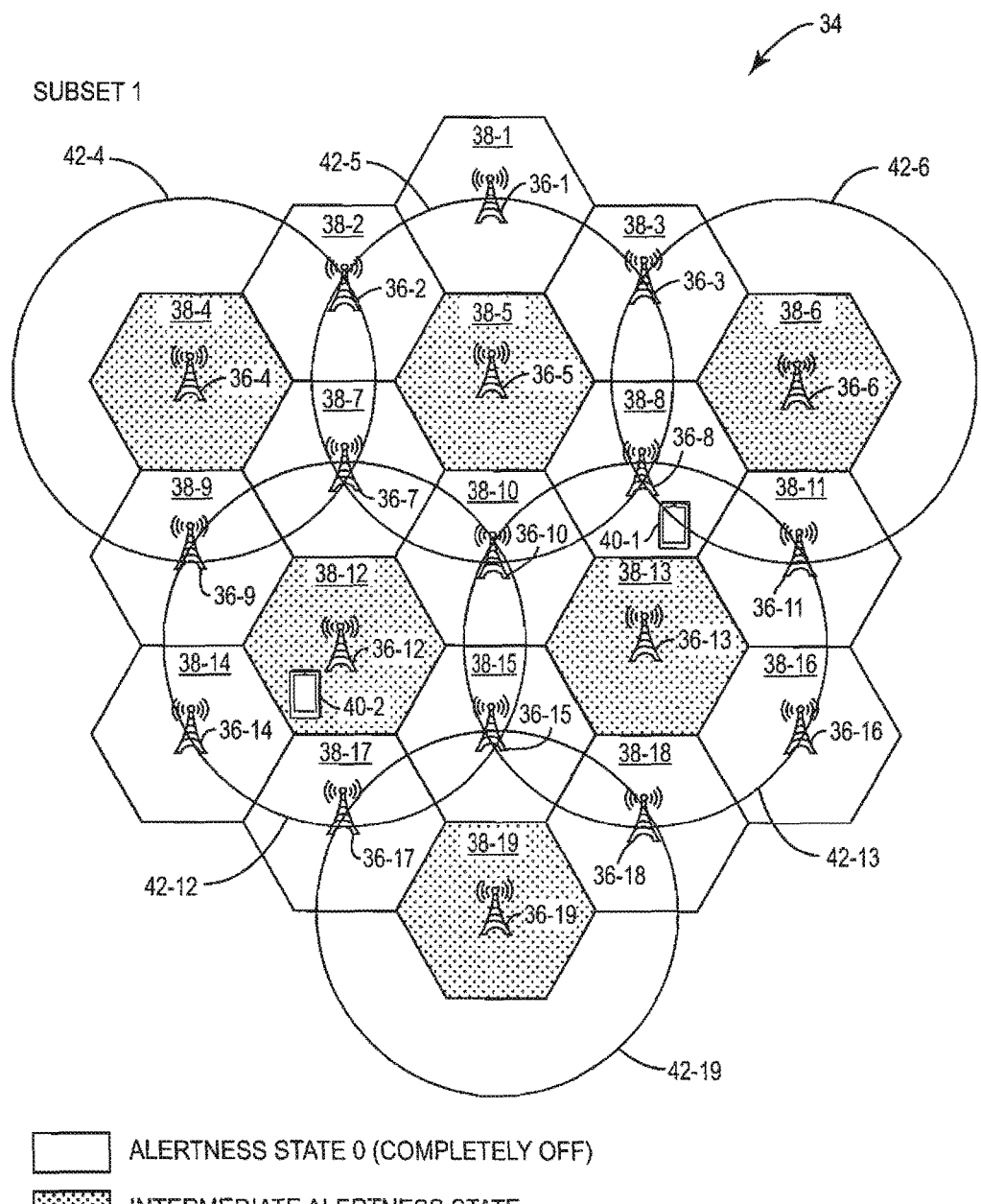
Figure 24B:
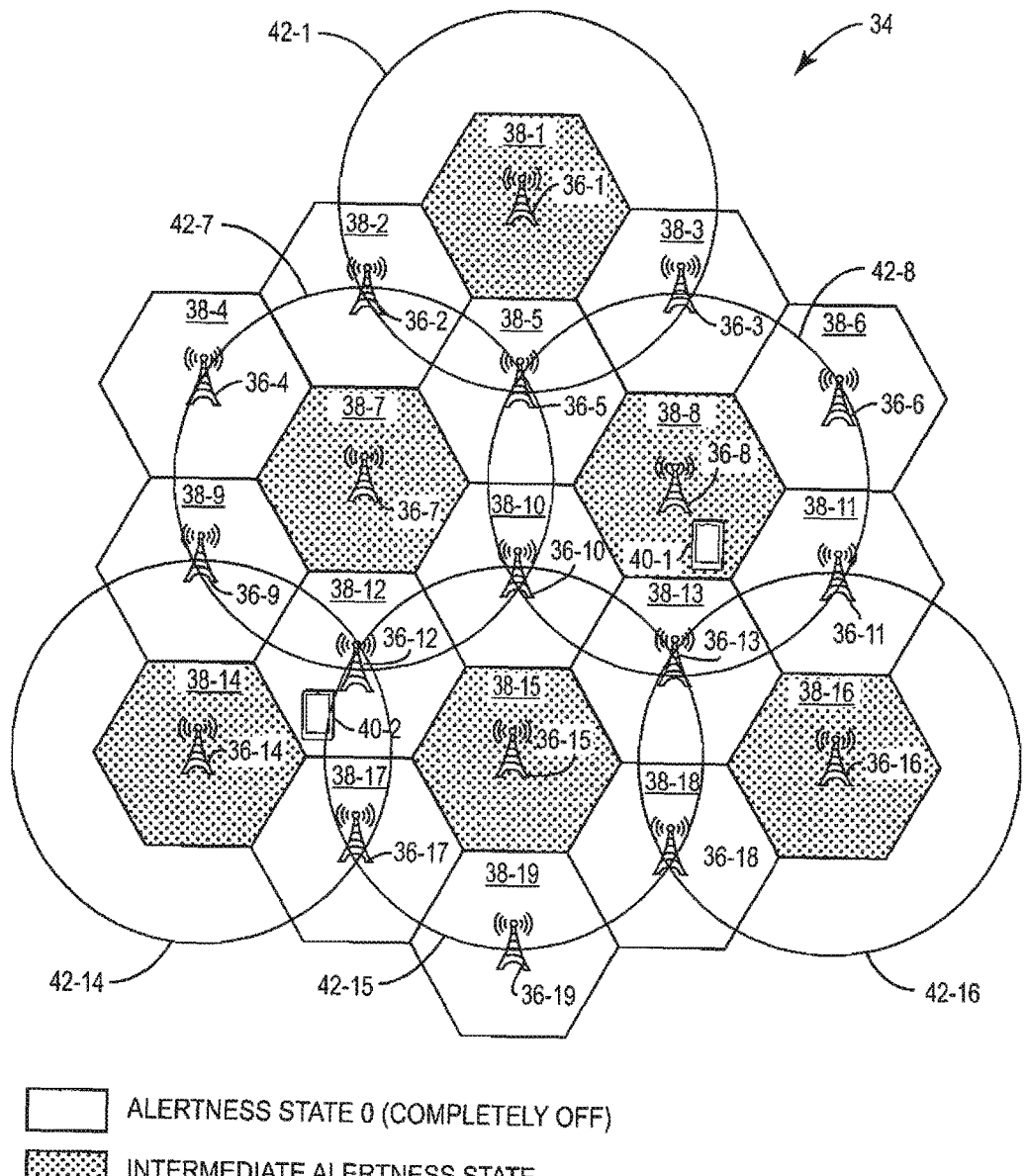
Figure 24C:
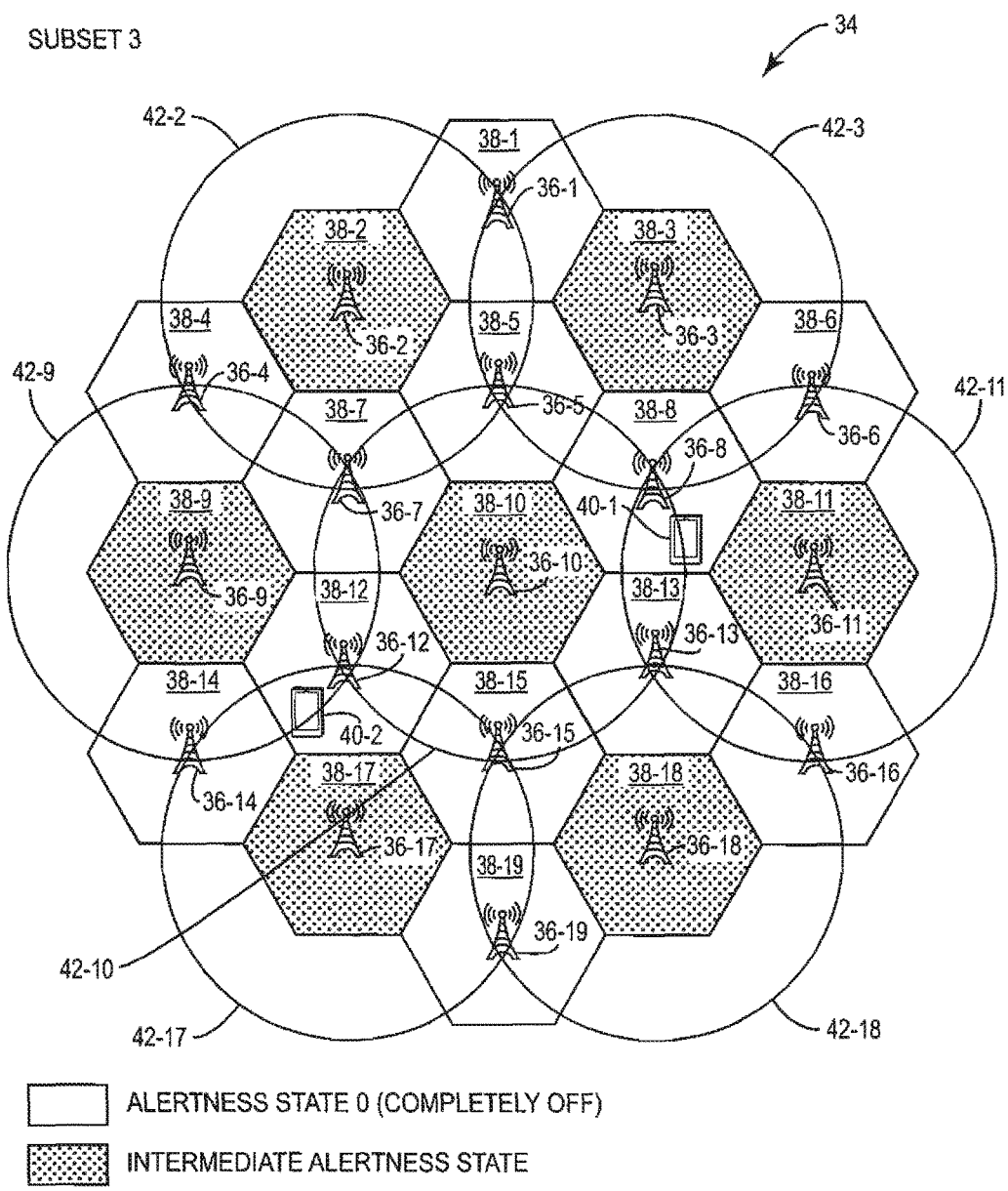
Figure 25:
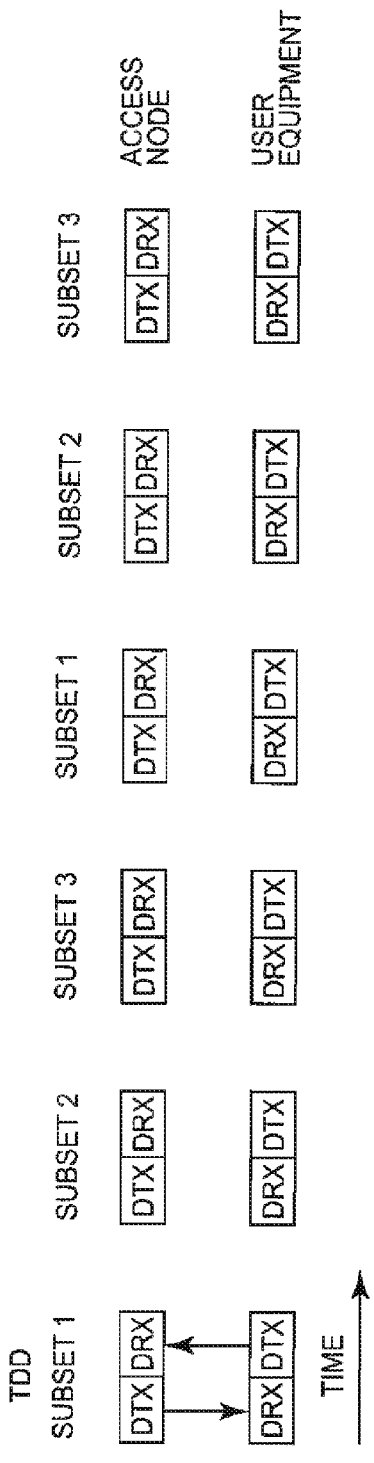
Figure 26:
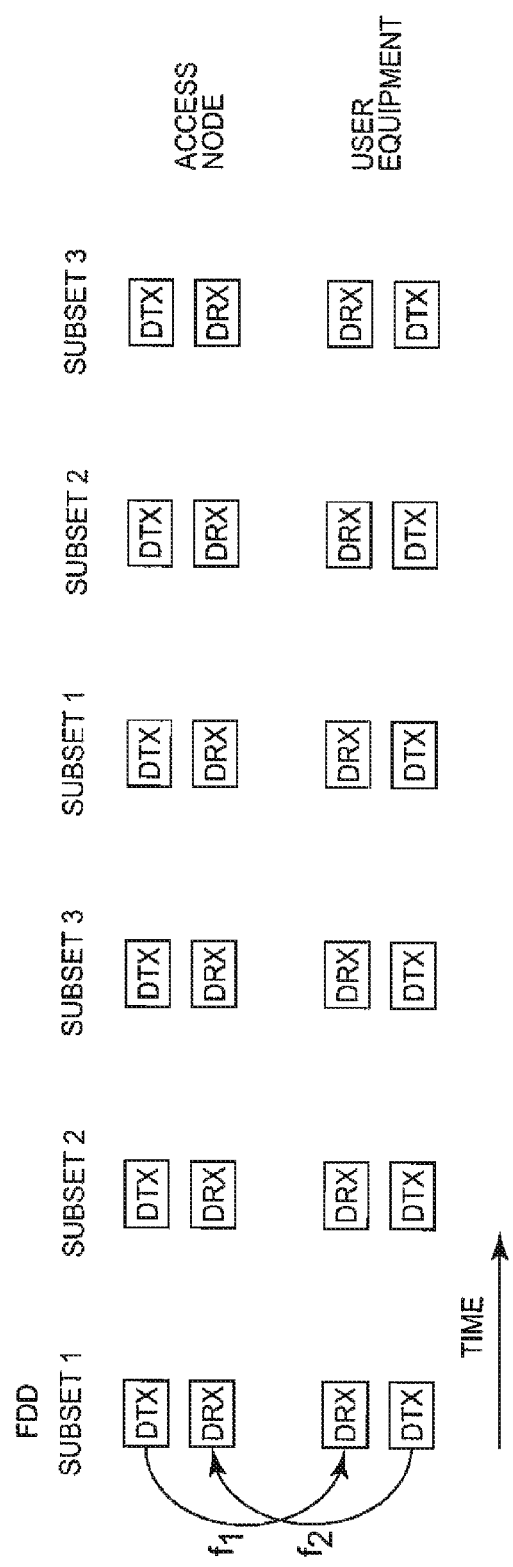
Figure 27:
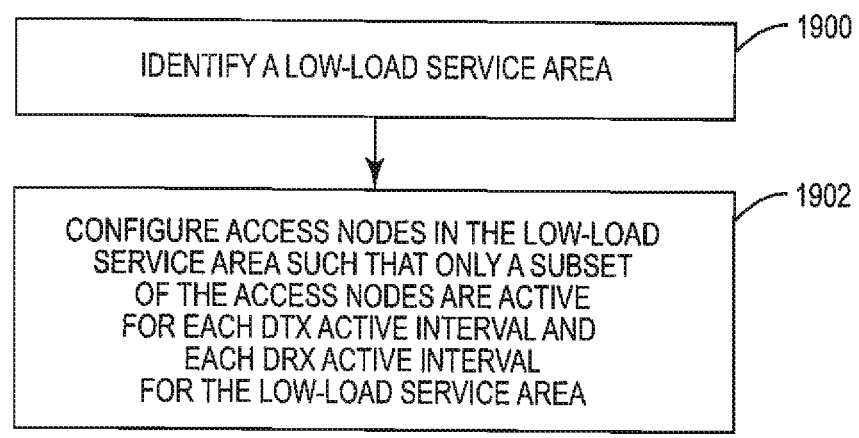
Figure 28:
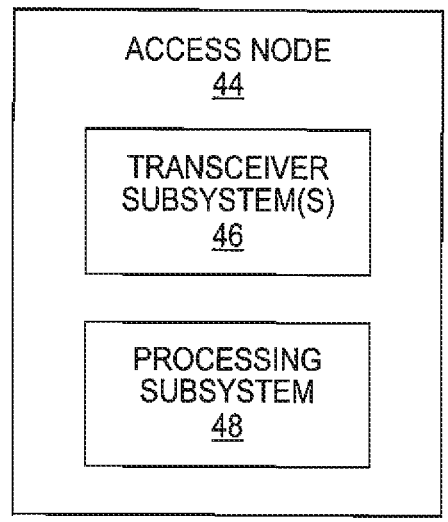
Figure 29:
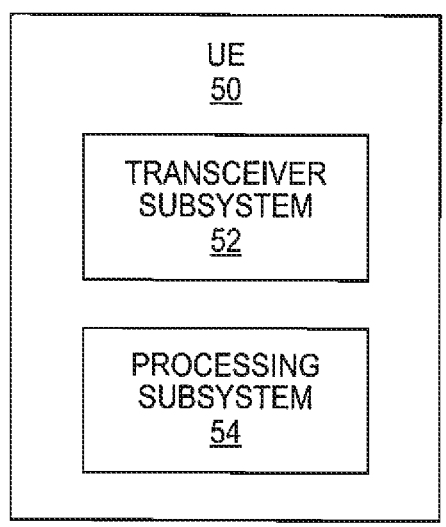
Figure 30:
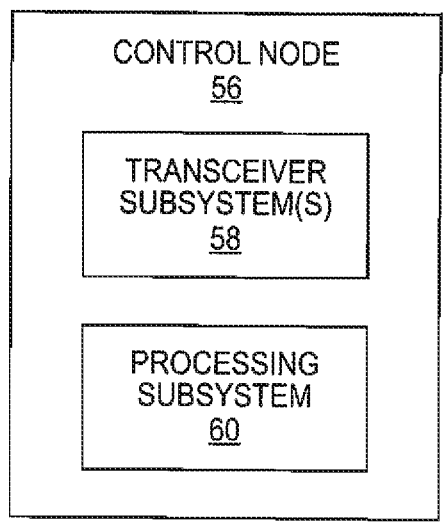

FIG. 21 graphically illustrates that a subset of the wireless access nodes in the low-load service area of FIG. 20 are configured in an intermediate alertness state to provide radio coverage for the low-load service area according to one embodiment of the present disclosure;

FIG. 22 illustrates exemplary DTX/DRX active intervals for the subset of the wireless access nodes in the low-load service area when operating in a TDD mode of operation according to one embodiment of the present disclosure;

FIG. 23 illustrates exemplary DTX/DRX active intervals for the subset of the wireless access nodes in the low-load service area when operating in a FDD mode of operation according to one embodiment of the present disclosure;

FIGS. 24A through 24C illustrate an embodiment of the present disclosure wherein different subsets of the wireless access nodes in the low-load service area of FIG. 20 are active during different DTX/DRX active intervals in order to provide radio coverage for the low-load service area;

FIG. 25 illustrates exemplary DTX/DRX active intervals for the different subsets of the wireless access nodes in the low-load service area illustrated in FIGS. 24A through 24C when operating in a TDD mode of operation according to one embodiment of the present disclosure;

FIG. 26 illustrates exemplary DTX/DRX active intervals for the different subsets of the wireless access nodes in the low-load service area illustrated in FIGS. 24A through 24C when operating in a FDD mode of operation according to one embodiment of the present disclosure;

FIG. 27 is a flow chart that illustrates a process for identifying a low-load service area and configuring the wireless access nodes in the low-load service area according to one embodiment of the present disclosure;

FIG. 28 is a block diagram of a wireless access node according to one embodiment of the present disclosure;

FIG. 29 is a block diagram of a UE according to one embodiment of the present disclosure; and FIG. 30 is a block diagram of a control node that operates to perform the process of FIG. 27 according to one embodiment of the present disclosure,

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
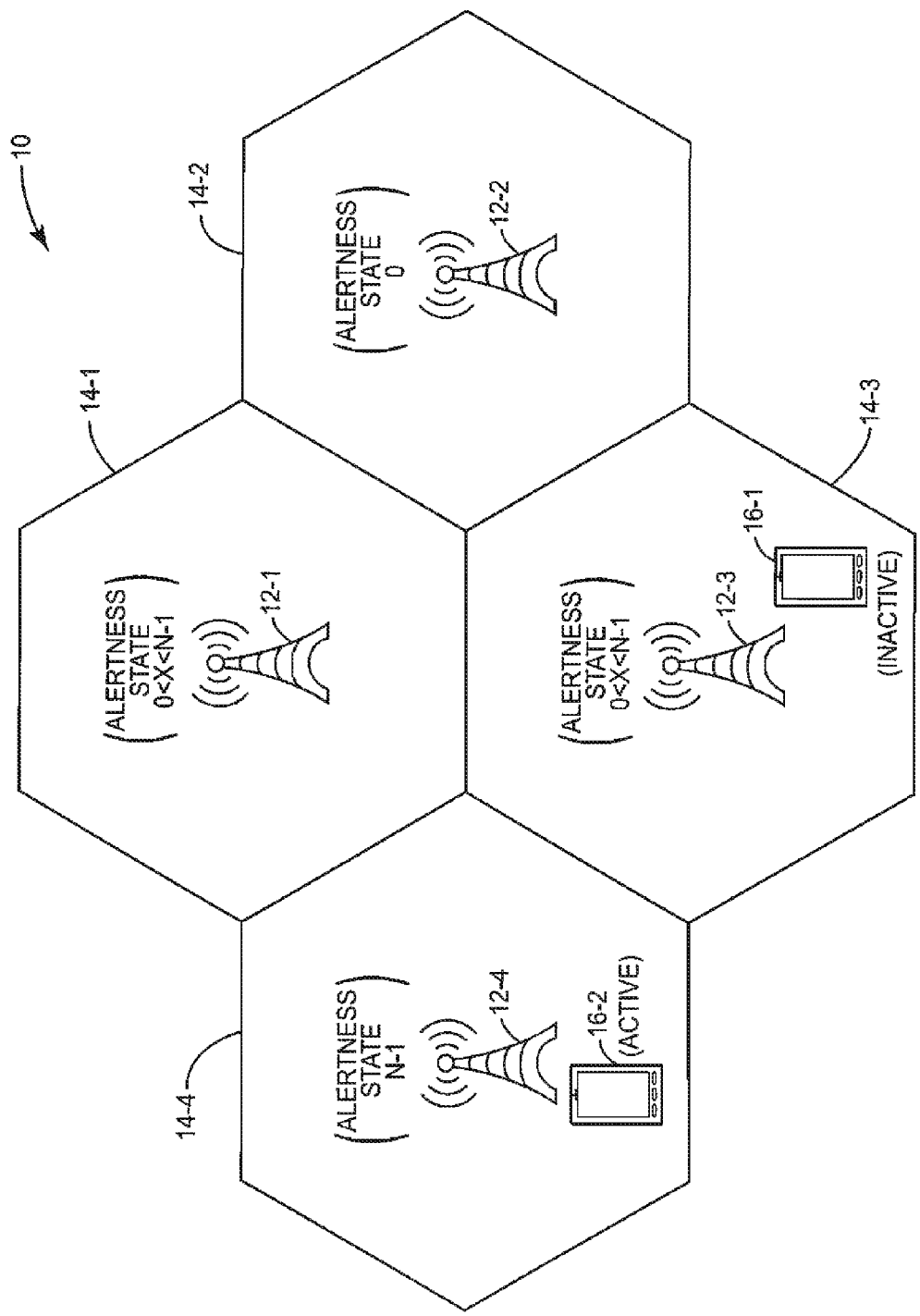
FIG. 1 illustrates a super dense network including energy efficient wireless access nodes according to one embodiment of the present disclosure.

FIG. 1 illustrates a super dense network 10 including a number of wireless access nodes 12-1 through 12-4 (generally referred to herein collectively as wireless access nodes 12 and individually as wireless access node 12) operating in an energy efficient manner according to one embodiment of the present disclosure. As used herein, the super dense network 10 is a cellular communication network or a portion of a cellular communication network where the wireless access nodes 12 forming the super dense network 10 serve on average less than one active user equipment device (UE) at a time. Notably, while the term "UE" is used herein, upon reading this disclosure, one of ordinary skill in the art will readily appreciate that the term "UE" refers to any type of wireless device served by the super dense network 10 and is not limited to those devices operated by a "user," Also, the concepts disclosed herein are not limited to the super dense network 10 and are applicable to any dense deployment of wireless access nodes 12 in a cellular communication network.

The wireless access nodes 12 are generally low-power wireless access nodes, which may also be referred to as micro access nodes or micro base stations, that serve UEs located in corresponding cells 14-1 through 14-4 (generally referred to herein collectively as cells 14 and individually as cell 14). In the illustrated example, there are two UEs 16-1 and 16-2 (generally referred to herein collectively as UEs 16 and individually as UE 16). Note that while FIG. 1 illustrates four wireless access nodes 12 and two UEs 16 for clarity and ease of discussion, it should be understood that the super dense network 10 may include any number of wireless access nodes 12 and UEs 16. Further, while in this example the cells 14 in the super dense network 10 are contiguous, the super dense network 10 is not limited thereto. Specifically, the super dense network 10 may include any type of arrangement of wireless access nodes 12 which may result in multiple distributed blocks of contiguous cells 14 and potentially some cells 14 that are not contiguous with any other cell 14.

As discussed below in detail, the wireless access nodes 12 and the UEs 16 operate in a discontinuous transmit and discontinuous receive (DTX/DRX) mode of operation. One or more duty cycles for the DTX/DRX mode of operation of each of the wireless access nodes 12 are controlled based on an alertness state of that wireless access node 12. Much of this disclosure focuses on embodiments where there is a common duty cycle for both DTX active intervals and DRX active intervals for the DTX/DRX mode of operation. However, alternatively, a duty cycle for the DTX active intervals and a duty cycle for the DRX active intervals may be separately controlled and may not be equal. Similarly, one or more duty cycles for the DTX/DRX mode of operation of each of the UEs 16 are controlled based on an alertness state of that UE 16. In general, the duty cycle(s) for the DTX/DRX mode of operation increase(s) with the alertness state. In this manner, energy efficiency is substantially improved.

Figure 2A:
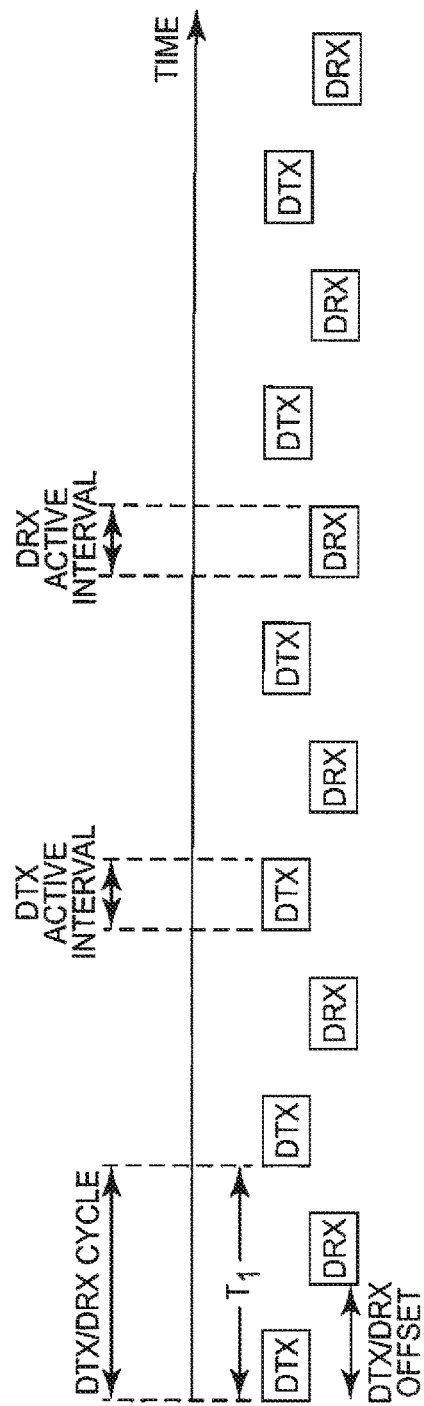
FIGS. 2A and 2B illustrate exemplary discontinuous transmit and discontinuous receive (DTX/DRX) cycles for two different DTX/DRX duty cycles according to one embodiment of the present disclosure.
Figure 2B:
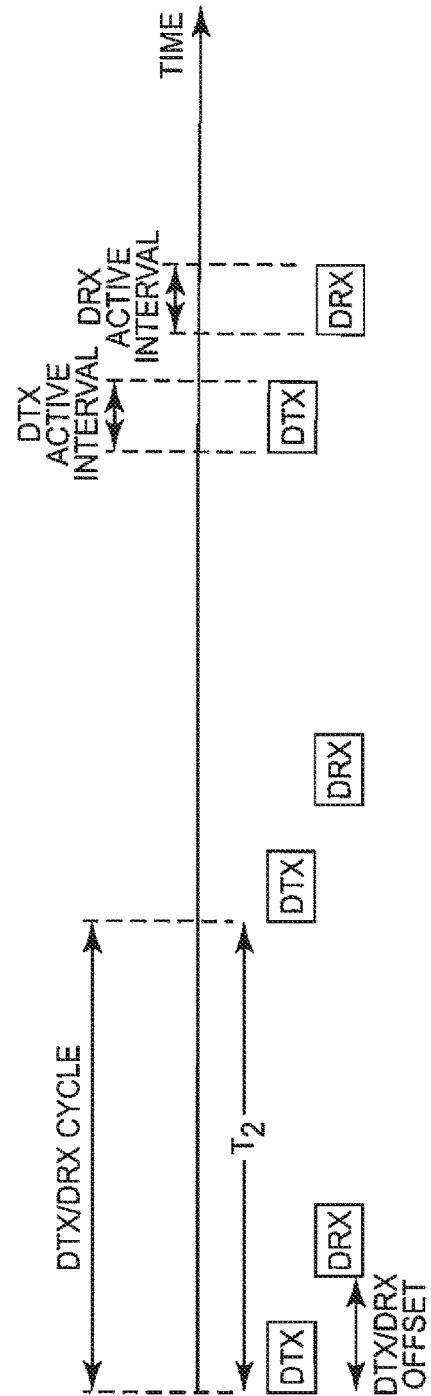

More specifically, FIGS. 2A and 2B illustrate two exemplary DTX and DRX patterns wherein DTX active intervals and DRX active intervals for the DTX/DRX mode of operation are arranged in DTX/DRX cycles and have a common duty cycle according to one embodiment of the present disclosure. As illustrated in FIG. 2A, the DTX/DRX mode of operation defines numerous periodic DTX/DRX cycles. Each DTX/DRX cycle includes a DTX active interval (DTX) during which a transmitter of the corresponding device (i.e., the wireless access node 12 or the UE 16) is activated and a DRX active interval (DRX) during which a receiver of the corresponding device (i.e., the wireless access node 12 or the UE 16) is activated. Cycle period ($T_1$) is a time from the start of one DTX/DRX cycle to the start of the next DTX/DRX cycle. As the time ($T_1$) decreases, the duty cycle for the DTX/DRX mode of operation increases (i.e., in this embodiment, as the time ($T_1$) decreases, the common duty cycle for both the DTX active intervals and the DRX active intervals increases). Specifically, the duty cycle for the DTX/DRX mode of operation is defined as the duration of the active interval (i.e., the duration of either the DTX active interval or the DRX active interval since they are equal) divided by the cycle period ($T_1$). For example, for a Long Term Evolution (LTE) network, each of the DTX/DRX active intervals may correspond to one or more frames, and the duty cycle for the DTX/DRX mode of operation may be defined as the number of DTX/DRX active intervals per a defined number of frames. It should be noted that while in many of the embodiments described herein the DTX active interval is equal to the DRX active interval, the present disclosure is not limited thereto. The DTX active interval may be greater than, less than, or equal to the DRX active interval depending on the particular implementation.

Within each DTX/DRX cycle, there is a time offset (DTX/DRX offset) from the start of the DTX active interval to the start of the DRX active interval. The DTX/DRX offset is a desired time offset for the particular implementation. For example, as discussed below, for Frequency Division Duplex (FDD) operation, the DTX/DRX offset may be 0. As another example, as discussed below, for Time Division Duplex (TDD) operation or for Half-Duplex Frequency Division Duplex (H-FDD) operation, the DTX/DRX offset may be equal to a duration of the DTX active interval. As yet another example, the DTX/DRX offset may be greater than the duration of the DTX active interval.

FIG. 2B is substantially the same as FIG. 2A. However, in FIG. 2B, the time the start of one DTX/DRX cycle and the start of the next DTX/DRX cycle is a time ($T_2$), where $T_2$ is greater than $T_1$. As such, the duty cycle for the DTX/DRX mode of operation in FIG. 2B is less than the duty cycle for the DTX/DRX mode of operation in FIG. 2A.

Figure 2C:
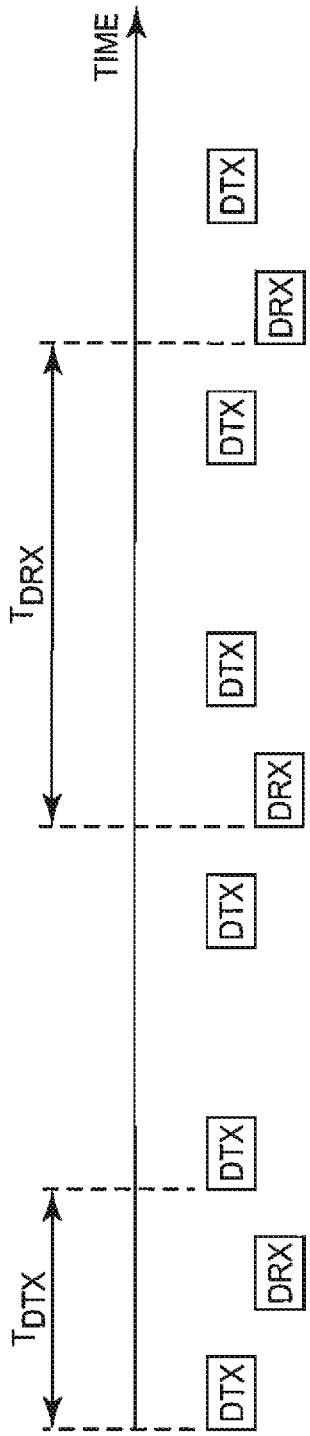
FIGS. 2C and 2D illustrate exemplary embodiments where a DTX duty cycle and a DRX duty cycle for a DTX/DRX mode of operation are independently controlled and may not be equal according to one embodiment of the present disclosure.
Figure 2D:
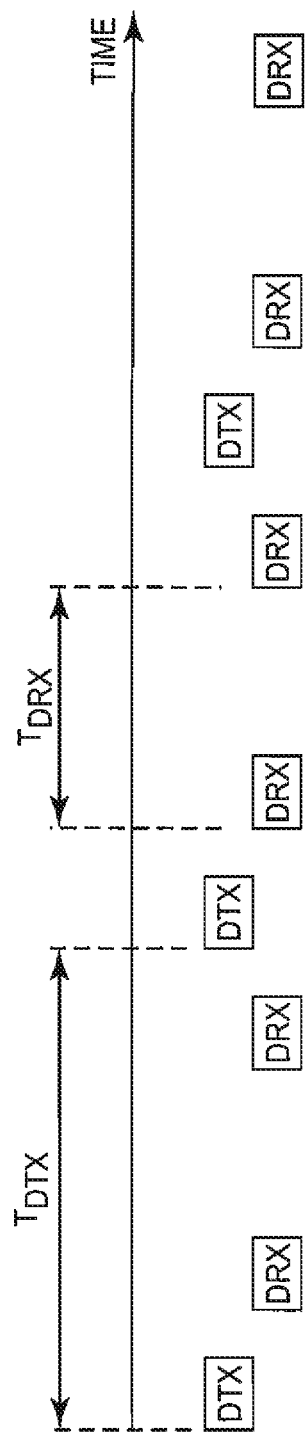

FIGS. 2C and 2D illustrate two exemplary DTX/DRX patterns wherein a duty cycle for the DTX active intervals and a duty cycle for the DRX active intervals are separately controlled and may not be equal according to another embodiment of the present disclosure. While this disclosure focuses on embodiments where the duty cycle for the DTX active intervals and the duty cycle for the DRX active intervals are equal (i.e., there is a common duty cycle for the DTX/DRX mode of operation), the present disclosure is not limited thereto. For instance, as illustrated in FIG. 2C, the duty cycle for the DTX active intervals may be greater than the duty cycle for the DRX active intervals. In other words, a time between successive DTX active intervals, $T_{DTX}$, may be less than a time between successive DRX active intervals, $T_{DRX}$. In contrast, as illustrated in FIG. 2D, the duty cycle for the DTX active intervals may be less than the duty cycle for the DRX active intervals. In other words, the time between successive DTX active intervals, $T_{DTX}$, may be greater than the time between successive DRX active intervals, $T_{DRX}$. Note that the duty cycle for the DTX active intervals and/or the duty cycle for the DRX active intervals are controlled based on an alertness state of the corresponding device (i.e., the corresponding wireless access node 12 or the corresponding UE 16) in the manner described below.

For the remainder of this disclosure, it is assumed that there is a common duty cycle for the DTX active intervals and the DRX active intervals for the DTX/DRX mode of operation, where this common duty cycle is referred to as the duty cycle for the DTX/DRX mode of operation. However, it should be appreciated that the concepts described are equally applicable to embodiments where the duty cycle for the DTX active intervals and the duty cycle for the DRX active intervals are separately controlled and may not be equal.

FIG. 3 illustrates a number of exemplary alertness states for each of the wireless access nodes 12 according to one embodiment of the present disclosure. In this exemplary embodiment, there are four alertness states, namely, alertness state 0, alertness state 1, alertness state 2, and alertness state 3. However, the number of alertness states may vary depending on the particular implementation. The alertness state 0 is a minimum alertness state for the wireless access node 12 and is also referred to herein as a deep sleep state. The alertness state 3 is a maximum alertness state for the wireless access node 12 and is also referred to herein as an active state. The alertness states 1 and 2 are intermediate alertness states, where the alertness state 2 is a higher alertness state than the alertness state 1.

Duty cycles for the DTX/DRX mode of operation for the wireless access node 12 are pre-assigned to the alertness states 0 to 3. In general, the duty cycle for the DTX/DRX mode of operation increases as the alertness state increases from alertness state 0 to alertness state 3. In one embodiment, each of the alertness states is assigned a different duty cycle for the DTX/DRX mode of operation where the duty cycle increases from alertness state 0 to alertness state 3 (i.e., the duty cycle for alertness state 3>the duty cycle for alertness state 2>the duty cycle for alertness state 1>the duty cycle for alertness state 0). In another embodiment, the duty cycle for the DTX/DRX mode of operation increases as the alertness state increases from alertness state 0 to alertness state 3 but the same duty cycle may be assigned to more than one of the alertness states (i.e., the duty cycle for alertness state 3>the duty cycle for alertness state 0, and the duty cycle for alertness state 3≥the duty cycle for alertness state 2≥the duty cycle for alertness state 1≥the duty cycle for alertness state 0).

Figure 4:
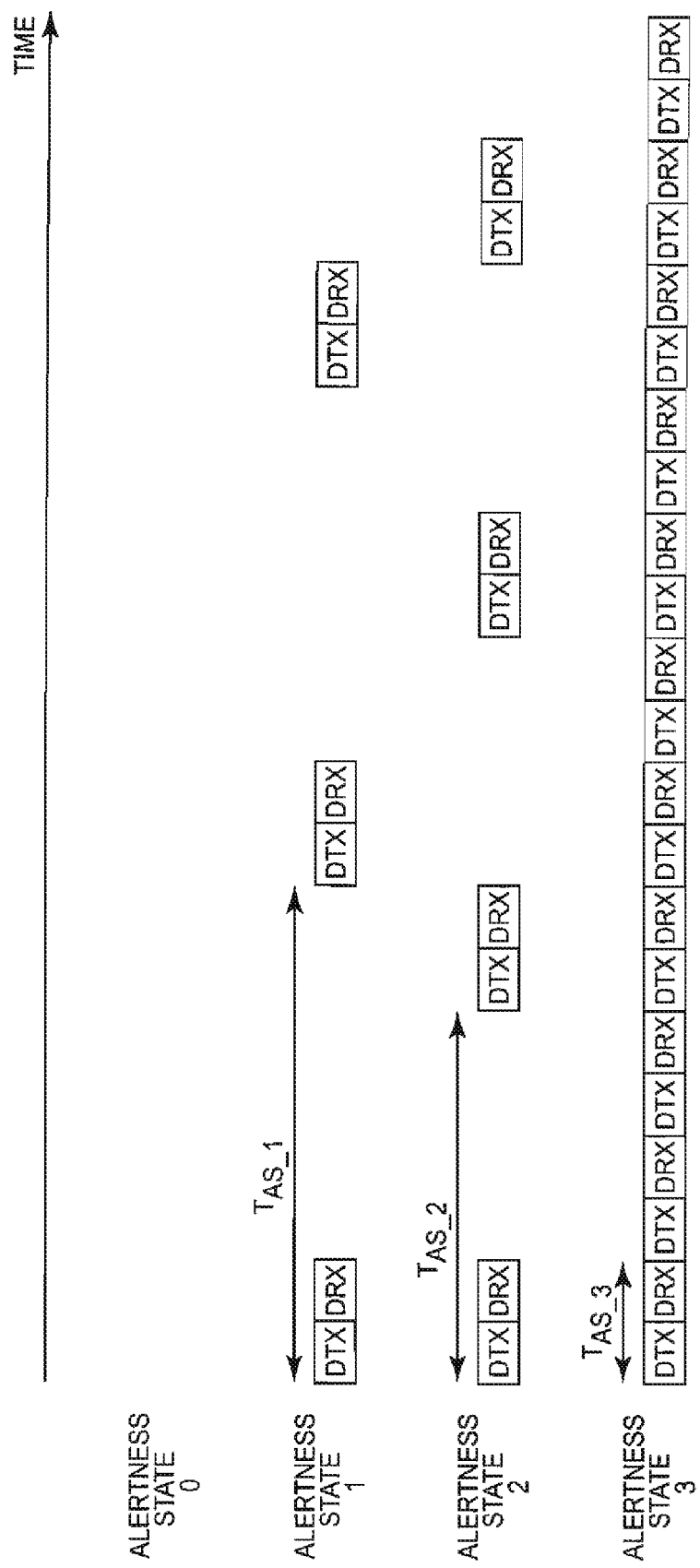
FIG. 4 illustrates exemplary DTX/DRX duty cycles assigned to the alertness states shown in FIG. 3 for a Time Division Duplex (TDD) mode of operation for the wireless access nodes in the super dense network according to one embodiment of the present disclosure.

FIG. 4 illustrates DTX/DRX cycles for the different alertness states of FIG. 3 for TDD operation, where each alertness state has a different duty cycle for the DTX/DRX mode of operation according to one embodiment of the present disclosure. It should be clear to those skilled in the art that the same illustration applies to H-FDD operation where transmission and reception are carried out at different times and frequencies, and thus hereinafter we focus our descriptions on the TDD operation in this embodiment. Notably, in this embodiment, the DTX/DRX offset is equal to a duration of the DTX active interval such that the DTX active intervals and the DRX active intervals in the same DTX/DRX cycles are adjacent to one another in time. This may be preferable in order to avoid frequently ramping-up or ramping-down radio frequency circuits. As shown, the duty cycle for alertness state 3 is greater than the duty cycle for alertness state 2, which is greater than the duty cycle for alertness state 1, which is greater than the duty cycle for alertness state 0. In other words, the time from the start of one DTX/DRX cycle to the start of the next DTX/DRX cycle for alertness state 0 (which is effectively infinite in this example) is greater than time $(T_{AS\_1})$ from the start of one DTX/DRX cycle to the start of the next DTX/DRX cycle for alertness state 1, which is greater than time $(T_{AS\_2})$ from the start of one DTX/DRX cycle to the start of the next DTX/DRX cycle for alertness state 2, which is greater than time $(T_{AS\_3})$ from the start of one DTX/DRX cycle to the start of the next DTX/DRX cycle for alertness state 3.

Notably, in this example, the duty cycle for alertness state 0 is such that the transmitter and the receiver of the wireless access node 12 are completely off. However, in another embodiment, the transmitter and the receiver of the wireless access node 12 may be periodically, but infrequently, active for alertness state 0. Similarly, in this example, the duty cycle for alertness state 3 is such that the transmitter and receiver of the wireless access node 12 are continuously active. However, in another embodiment, the transmitter and the receiver of the wireless access node 12 may be periodically and frequently, but not continuously, active for alertness state 3.

In one embodiment, the DTX active intervals and the DRX active intervals correspond to frames in the corresponding uplink or downlink channel. As an example, for alertness state 0, there may be no DTX active intervals or DRX active intervals; for alertness state 1, the DTX active intervals may be frame 1, frame 9, frame 17, etc., and the DRX active intervals may be frame 2, frame 10, frame 18, etc.; for alertness state 2, the DTX active intervals may be frame 1, frame 7, frame 13, etc., and the DRX active intervals may be frame 2, frame 8, frame 14, etc.; and for alertness state 3, the DTX active intervals may be frame 1, frame 3, frame 5, etc., and the DRX active intervals may be frame 2, frame 4, frame 6, etc. However, this example is for illustrative purposes only and is not intended to limit the scope of the present disclosure.

Figure 5:
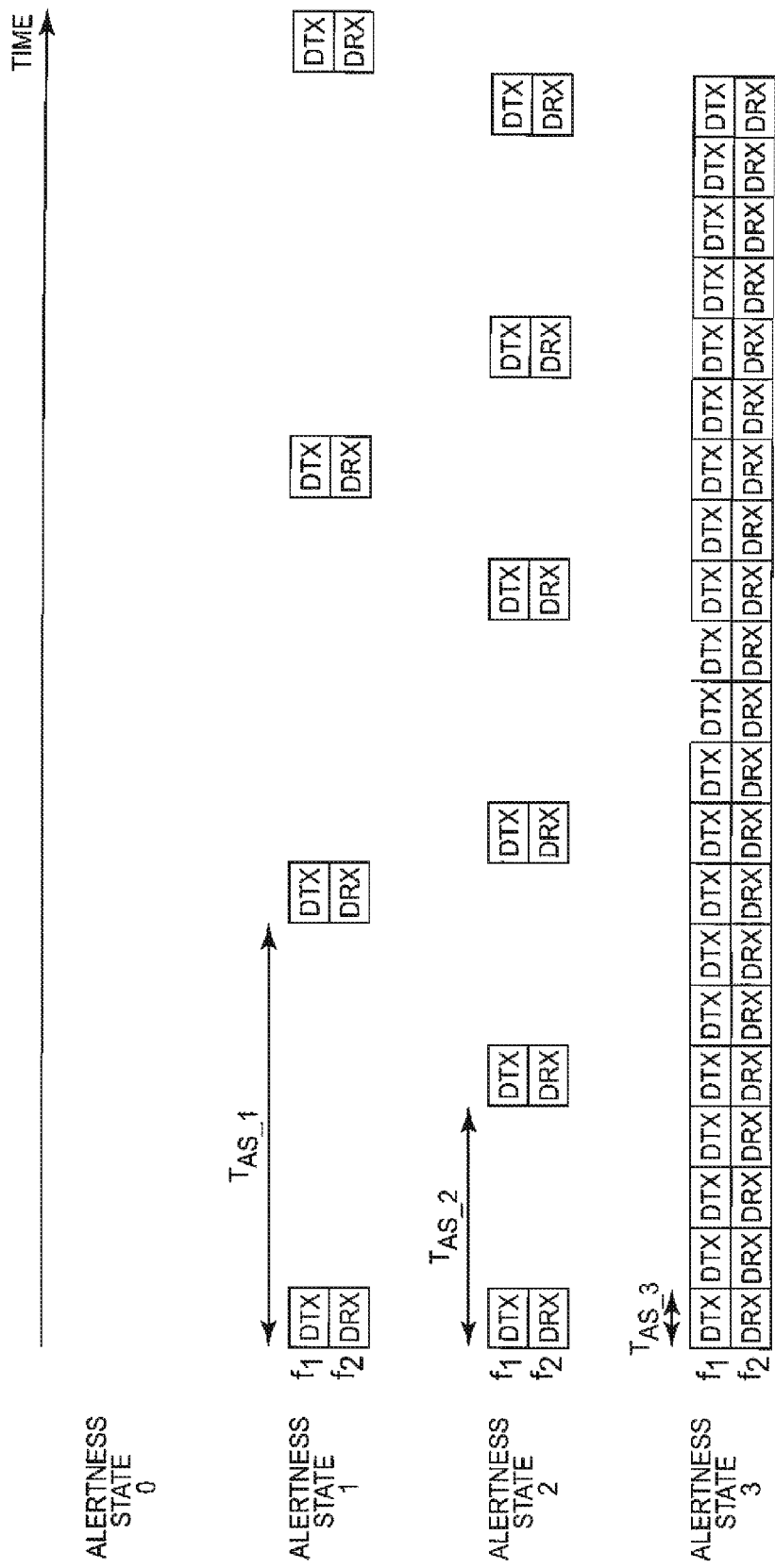
FIG. 5 illustrates exemplary DTX/DRX duty cycles assigned to the alertness states shown in FIG. 3 for a Frequency Division Duplex (FDD) mode of operation for the wireless access nodes in the super dense network according to one embodiment of the present disclosure.

FIG. 5 illustrates DTX/DRX cycles for the different alertness states of FIG. 3 for FDD operation, where each alertness state has a different duty cycle for the DTX/DRX mode of operation according to one embodiment of the present disclosure. Notably, in this embodiment, the DTX/DRX offset is equal to 0 such that the DTX active intervals and the DRX active intervals in the same DTX/DRX cycles are time-aligned, but due to FDD operation use different frequencies. This may be preferable in order to avoid frequently ramping-up or ramping-down radio frequency circuits. As shown, the duty cycle for alertness state 3 is greater than the duty cycle for alertness state 2, which is greater than the duty cycle for alertness state 1, which is greater than the duty cycle for alertness state 0. In other words, the time from the start of one DTX/DRX cycle to the start of the next DTX/DRX cycle for alertness state 0 (which is effectively infinite in this example) is greater than time $(T_{AS\_1})$ from the start of one DTX/DRX cycle to the start of the next DTX/DRX cycle for alertness state 1, which is greater than time $(T_{AS\_2})$ from the start of one DTX/DRX cycle to the start of the next DTX/DRX cycle for alertness state 2, which is greater than time $(T_{AS\_3})$ from the start of one DTX/DRX cycle to the start of the next DTX/DRX cycle for alertness state 3.

Notably, in this example, the duty cycle for alertness state 0 is such that the transmitter and the receiver of the wireless access node 12 are completely off. However, in another embodiment, the transmitter and the receiver of the wireless access node 12 may be periodically, but infrequently, active for alertness state 0. Similarly, in this example, the duty cycle for alertness state 3 is such that the transmitter and receiver of the wireless access node 12 are continuously active. However, in another embodiment, the transmitter and the receiver of the wireless access node 12 may be periodically and frequently, but not continuously, active for alertness state 3.

In one embodiment, the DTX active intervals and the DRX active intervals correspond to frames in the corresponding uplink or downlink channel. As an example, for alertness state 0, there may be not DTX active intervals or DRX active intervals; for alertness state 1, the DTX active intervals may be frame 1, frame 7, frame 13, etc., and the DRX active intervals may be frame 2, frame 8, frame 14, etc.; for alertness state 2, the DTX active intervals may be frame 1, frame 5, frame 9, etc., and the DRX active intervals may be frame 2, frame 6, frame 10, etc.; and for alertness state 3, the DTX active intervals may be frame 1, frame 2, frame 3, etc., and the DRX active intervals may be frame 1, frame 2, frame 3, etc. However, this example is for illustrative purposes only and is not intended to limit the scope of the present disclosure.

Figure 6:
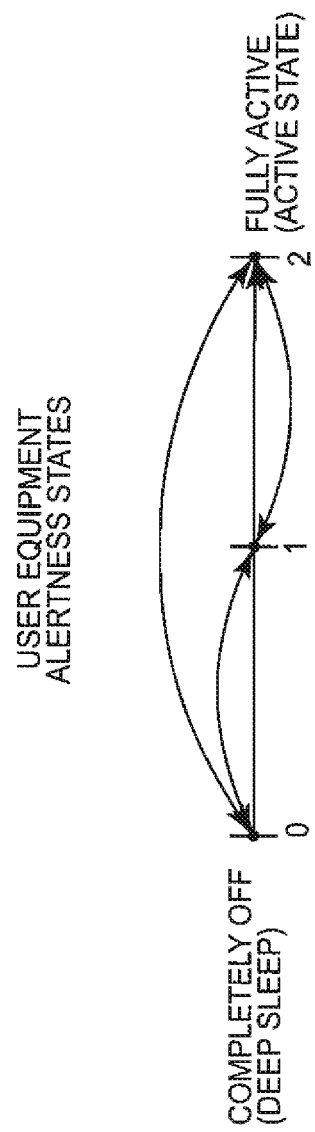
FIG. 6 illustrates exemplary alertness states for user equipment devices (UEs) in the super dense network of FIG. 1 according to one embodiment of the present disclosure.
Figure 7:
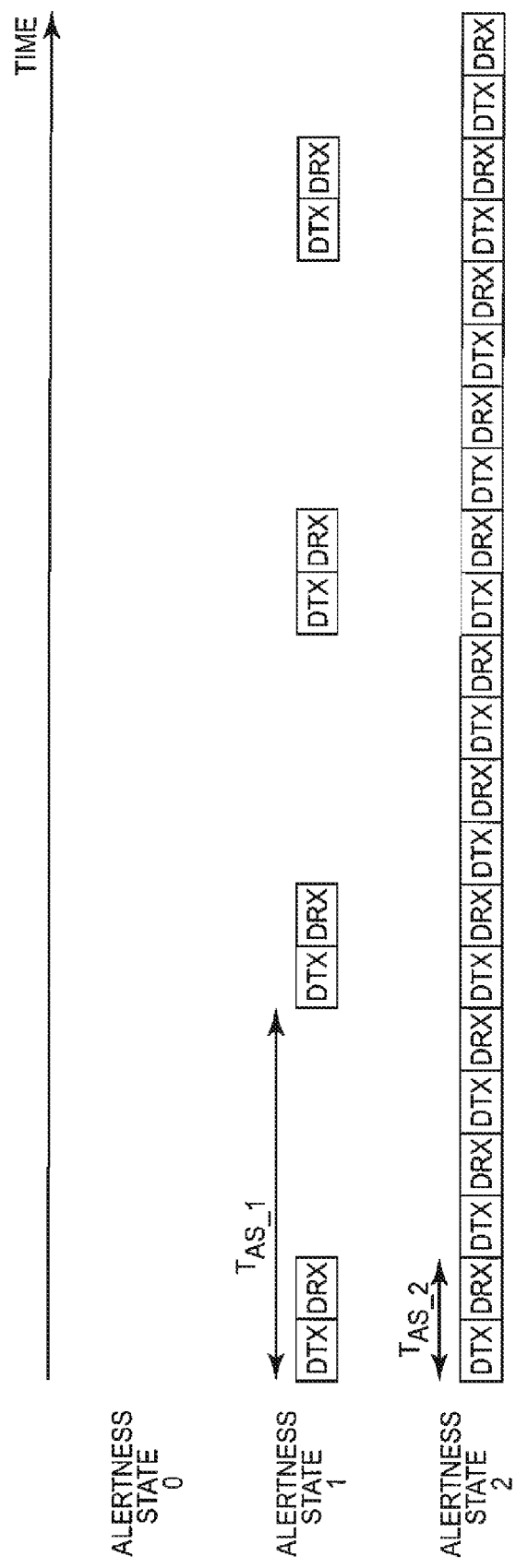
FIG. 7 illustrates exemplary DTX/DRX duty cycles assigned to the alertness states shown in FIG. 6 for a TDD mode of operation for the UEs in the super dense network according to one embodiment of the present disclosure.
Figure 8:
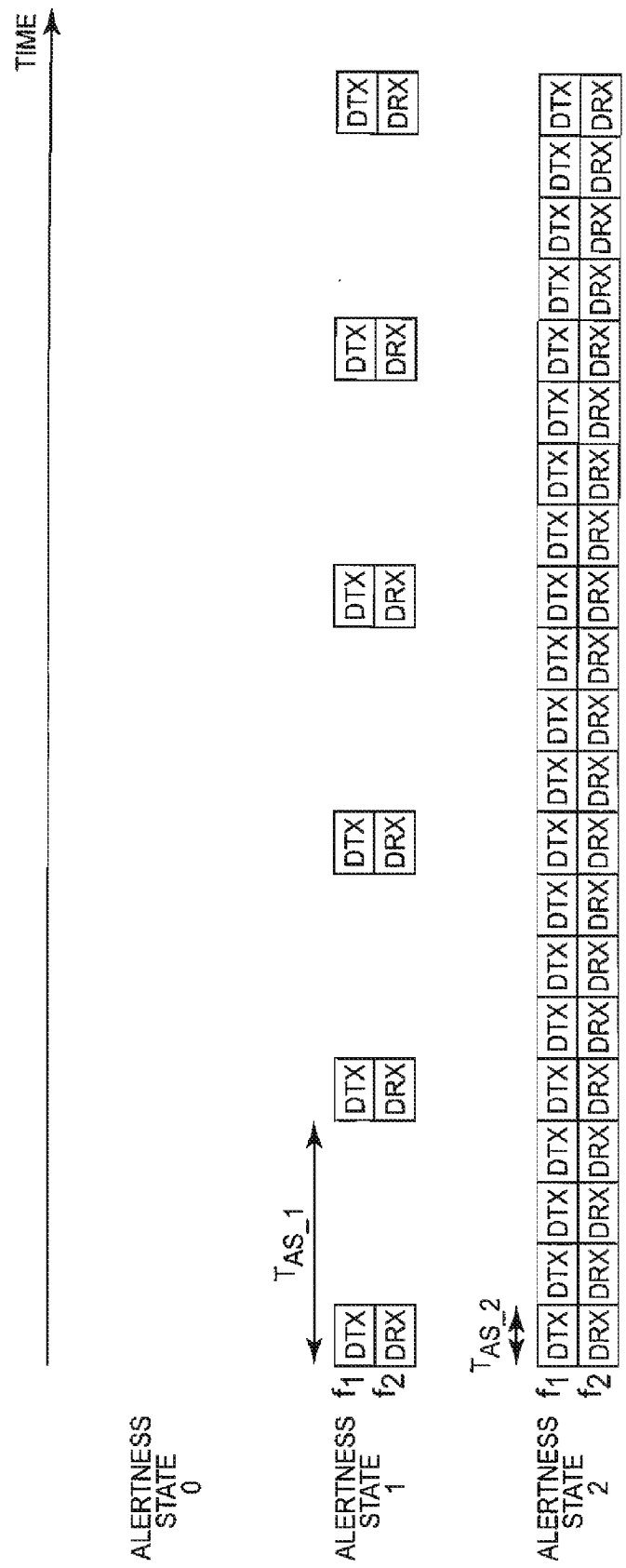
FIG. 8 illustrates exemplary DTX/DRX duty cycles assigned to the alertness states shown in FIG. 6 for a FDD mode of operation for the UEs in the super dense network according to one embodiment of the present disclosure.

FIGS. 6 through 8 are similar to FIGS. 3 through 5, but illustrate exemplary alertness states and duty cycles for the UEs 16 according to corresponding embodiments of the present disclosure. More specifically, FIG. 6 illustrates a number of exemplary alertness states for each of the UEs 16 according to one embodiment of the present disclosure. In this exemplary embodiment, there are three alertness states, namely, alertness state 0, alertness state 1, and alertness state 2. The alertness state 0 is a minimum alertness state for the UE 16 and is also referred to herein as a deep sleep state. The alertness state 2 is a maximum alertness state for the UE 16 and is also referred to herein as an active state. The alertness state 1 is an intermediate alertness state.

Duty cycles for the DTX/DRX mode of operation for the UE 16 are pre-assigned to the alertness states 0 to 2. In general, the duty cycle for the DTX/DRX mode of operation increases as the alertness state increases from alertness state 0 to alertness state 2. In one embodiment, each of the alertness states is assigned a different duty cycle for the DTX/DRX mode of operation where the duty cycle increases from alertness state 0 to alertness state 2 (i.e., the duty cycle for alertness state 2>the duty cycle for alertness state 1>the duty cycle for alertness state 0). In another embodiment, the duty cycle for the DTX/DRX mode of operation increases as the alertness state increases from alertness state 0 to alertness state 2 but the same duty cycle may be assigned to more than one of the alertness states (i.e., the duty cycle for alertness state 2>the duty cycle for alertness state 0, and the duty cycle for alertness state 2≥the duty cycle for alertness state 1≥the duty cycle for alertness state 0).

FIG. 7 illustrates DTX/DRX cycles for the different alertness states of FIG. 6 for TDD operation, where each alertness state has a different duty cycle for the DTX/DRX mode of operation according to one embodiment of the present disclosure. Notably, in this embodiment, the DTX/DRX offset is equal to a duration of the DTX active interval such that the DTX active intervals and the DRX active intervals in the same DTX/DRX cycles are adjacent to one another in time. This may be preferable in order to avoid frequently ramping-up or ramping-down radio frequency circuits. As shown, the duty cycle for alertness state 2 is greater than the duty cycle for alertness state 1, which is greater than the duty cycle for alertness state 0. In other words, the time from the start of one DTX/DRX cycle to the start of the next DTX/DRX cycle for alertness state 0 (which is effectively infinite in this example) is greater than time ($T_{AS\_1}$) from the start of one DTX/DRX cycle to the start of the next DTX/DRX cycle for alertness state 1, which is greater than time ($T_{AS\_2}$) from the start of one DTX/DRX cycle to the start of the next DTX/DRX cycle for alertness state 2.

Notably, in this example, the duty cycle for alertness state 0 is such that the transmitter and the receiver of the UE 16 are completely off, or continuously inactive. However, in another embodiment, the transmitter and the receiver of the UE 16 may be periodically, but infrequently, active for alertness state 0. Similarly, in this example, the duty cycle for alertness state 2 is such that the transmitter and the receiver of the UE 16 are continuously active. However, in another embodiment, the transmitter and the receiver of the UE 16 may be periodically and frequently, but not continuously, active for alertness state 2.

In one embodiment, the DTX active intervals and the DRX active intervals correspond to frames in the corresponding uplink or downlink channel. As an example, for alertness state 0, there may be no DTX active intervals or DRX active intervals; for alertness state 1, the DTX active intervals may be frame 1, frame 7, frame 13, etc., and the DRX active intervals may be frame 2, frame 8, frame 14, etc.; and for alertness state 2, the DTX active intervals may be frame 1, frame 3, frame 5, etc., and the DRX active intervals may be frame 2, frame 4, frame 6, etc. However, this example is for illustrative purposes only and is not intended to limit the scope of the present disclosure.

FIG. 8 illustrates DTX/DRX cycles for the different alertness states of FIG. 6 for FDD operation, where each alertness state has a different duty cycle for the DTX/DRX mode of operation according to one embodiment of the present disclosure. Notably, in this embodiment, the DTX/DRX offset is equal to 0 such that the DTX active intervals and the DRX active intervals in the same DTX/DRX cycles are time-aligned, but due to FDD operation use different frequencies. This may be preferable in order to avoid frequently ramping-up or ramping-down radio frequency circuits. As shown, the duty cycle for alertness state 2 is greater than the duty cycle for alertness state 1, which is greater than the duty cycle for alertness state 0. In other words, the time from the start of one DTX/DRX cycle to the start of the next DTX/DRX cycle for alertness state 0 (which is effectively infinite in this example) is greater than time ($T_{AS\_1}$) from the start of one DTX/DRX cycle to the start of the next DTX/DRX cycle for alertness state 1, which is greater than time ($T_{AS\_2}$) from the start of one DTX/DRX cycle to the start of the next DTX/DRX cycle for alertness state 2.

Notably, in this example, the duty cycle for alertness state 0 is such that the transmitter and the receiver of the UE 16 are completely off. However, in another embodiment, the transmitter and the receiver of the UE 16 may be periodically, but infrequently, active for alertness state 0. Similarly, in this example, the duty cycle for alertness state 2 is such that the transmitter and the receiver of the UE 16 are continuously active. However, in another embodiment, the transmitter and the receiver of the UE 16 may be periodically and frequently, but not continuously, active for alertness state 2.

In one embodiment, the DTX active intervals and the DRX active intervals correspond to frames in the corresponding uplink or downlink channel. As an example, for alertness state 0, there may be no DTX active intervals or DRX active intervals; for alertness state 1, the DTX active intervals may be frame 1, frame 5, frame 9, etc., and the DRX active intervals may be frame 1, frame 5, frame 9, etc.; and for alertness state 2, the DTX active intervals may be frame 1, frame 2, frame 3, etc., and the DRX active intervals may be frame 1, frame 2, frame 3, etc. However, this example is for illustrative purposes only and is not intended to limit the scope of the present disclosure.

Figure 9:
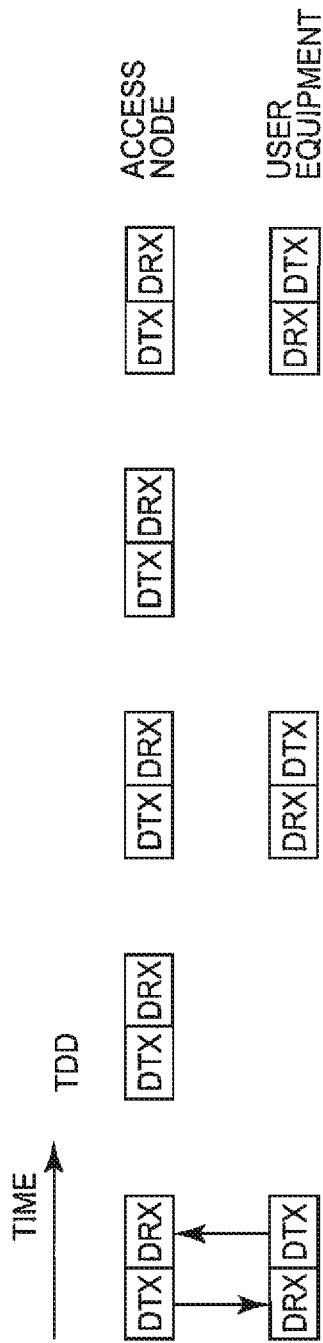
FIG. 9 illustrates time-alignment of DTX/DRX cycles of a wireless access node in the super dense network and DTX/DRX cycles of a UE for a TDD mode of operation according to one embodiment of the present disclosure.
Figure 10:
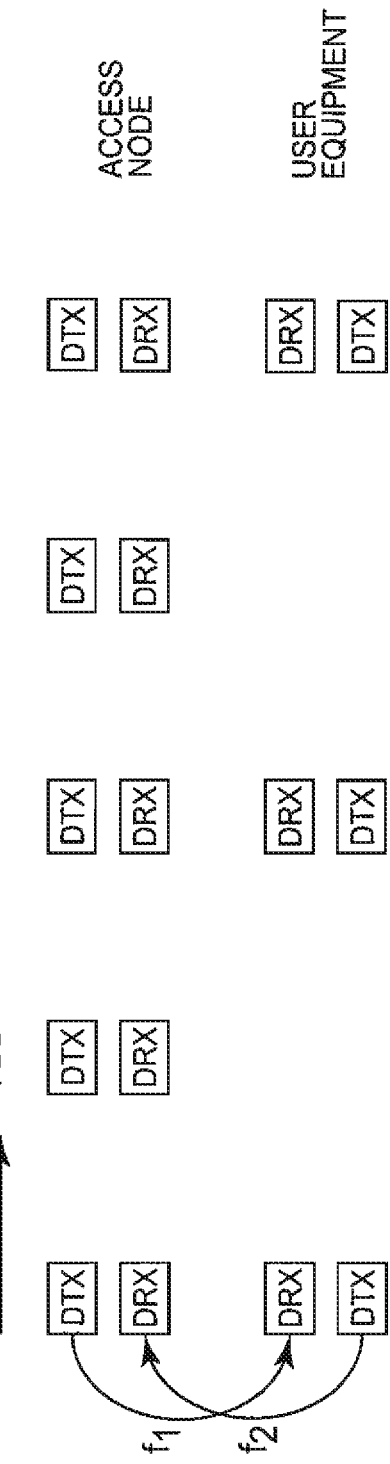
FIG. 10 illustrates time and frequency alignment of DTX/DRX cycles of a wireless access node in the super dense network and DTX/DRX cycles of a UE for a FDD mode of operation according to one embodiment of the present disclosure.

FIGS. 9 and 10 illustrate time-alignment of DTX cycles and corresponding DRX cycles between the wireless access node 12 and the UE 16 according to one embodiment of the present disclosure. In general, the DTX cycles and the DRX cycles are predefined such that, after synchronization of the wireless access node 12 and the UE 16: (1) at least a subset of the DTX active intervals for the wireless access node 12 are time-aligned with a least a subset of the DRX active intervals for the UE 16 regardless of the alertness states of the wireless access node 12 and the UE 16 and (2) at least a subset of the DRX active intervals for the wireless access node 12 are time-aligned with a least a subset of the DTX active intervals for the UE 16. Notably, this time-alignment is provided regardless of the alertness states of the wireless access node 12 and the UE 16. Therefore, even if the duty cycles for the wireless access node 12 and the UE 16 are different, the DTX cycles and the DRX cycles are predefined such that at least some of the DTX active intervals of the wireless access node 12 are time-aligned with at least some of the DRX active intervals of the UE 16 and at least some of the DRX active intervals of the wireless access node 12 are time-aligned with at least some of the DTX active intervals of the UE 16. Of course, if either the wireless access node 12 or the UE 16 is in alertness state 0 and the transmitter and the receiver of that device are continuously off for alertness state 0, then there would be no DTX active intervals or DRX active intervals to be time-aligned with corresponding DTX active intervals and DRX active intervals for the other device.

More specifically, FIG. 9 illustrates time-alignment of DTX cycles and corresponding DRX cycles between the wireless access node 12 and the UE 16 for TDD operation according to one embodiment of the present disclosure. As illustrated, in this particular example, the duty cycle for the DTX/DRX mode of operation of the wireless access node 12 is greater than the duty cycle for the DTX/DRX mode of operation of the UE 16. However, the present disclosure is not limited thereto. The duty cycle for the DTX/DRX mode of operation of the wireless access node 12 may alternatively be less than or equal to that of the UE 16. In this particular example, the DTX active interval of every other DTX/DRX cycle for the wireless access node 12 is time-aligned with a corresponding DRX active interval for the UE 16. As such, during those periods of time, signals transmitted by the wireless access node 12 can be received by the UE 16. Similarly, in this particular example, the DRX active interval of every other DTX/DRX cycle for the wireless access node 12 is time-aligned with a corresponding DTX active interval for the UE 16. As such, during those periods of time, signals transmitted by the UE 16 can be received by the wireless access node 12.

FIG. 10 illustrates time and frequency alignment of DTX cycles and corresponding DRX cycles between the wireless access node 12 and the UE 16 for FDD operation according to one embodiment of the present disclosure. As illustrated, in this particular example, the duty cycle for the DTX/DRX mode of operation of the wireless access node 12 is greater than the duty cycle for the DTX/DRX mode of operation of the UE 16. However, the present disclosure is not limited thereto. The duty cycle for the DTX/DRX mode of operation of the wireless access node 12 may alternatively be less than or equal to that of the UE 16. In this particular example, the DTX active interval of every other DTX/DRX cycle for the wireless access node 12 is time and frequency aligned with a corresponding DRX active interval for the UE 16. As such, during those periods of time, signals transmitted by the wireless access node 12 can be received by the UE 16. Similarly, in this particular example, the DRX active interval of every other DTX/DRX cycle for the wireless access node 12 is time and frequency aligned with a corresponding DTX active interval for the UE 16. As such, during those periods of time, signals transmitted by the UE 16 can be received by the wireless access node 12.

Figure 11:
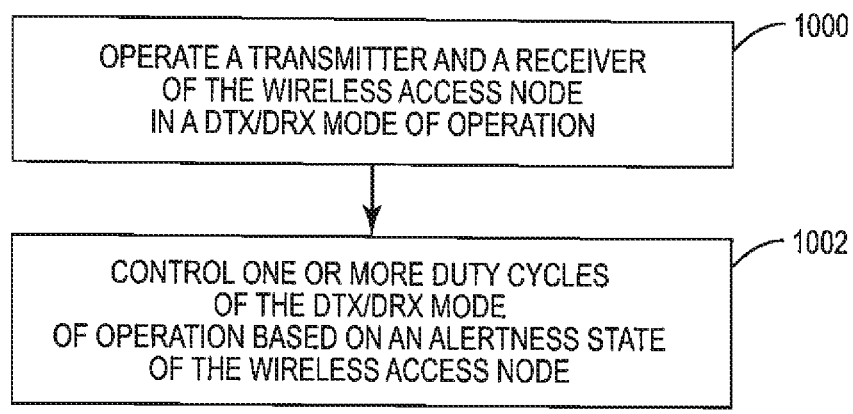
FIG. 11 is a flow chart that illustrates the operation of the wireless access nodes in the super dense network according to one embodiment of the present disclosure.

FIG. 11 is a flow chart illustrating the operation of the wireless access node 12 according to one embodiment of the present disclosure. First, the wireless access node 12 operates a transmitter and a receiver of the wireless access node 12 in a DTX/DRX mode of operation (step 1000). The wireless access node 12 then controls one or more duty cycles of the DTX/DRX mode of operation based on an alertness state of the wireless access node 12 (step 1002). As such, as the alertness state of the wireless access node 12 changes in response to triggering events, the wireless access node 12 changes the duty cycle of the DTX/DRX mode of operation appropriately. As discussed above, this disclosure focuses on embodiments where the one or more duty cycles are a common duty cycle for the DTX active intervals and the DRX active intervals of the DTX/DRX mode of operation, where this common duty cycle is referred to as the duty cycle of the DTX/DRX mode of operation. However, the present disclosure is not limited thereto. The one or more duty cycles controlled by the wireless access node 12 may be the duty cycle for the DTX active intervals, the duty cycle for the DRX active intervals, or both the duty cycle for the DTX active intervals and the duty cycle for the DRX active intervals.

Figure 12:
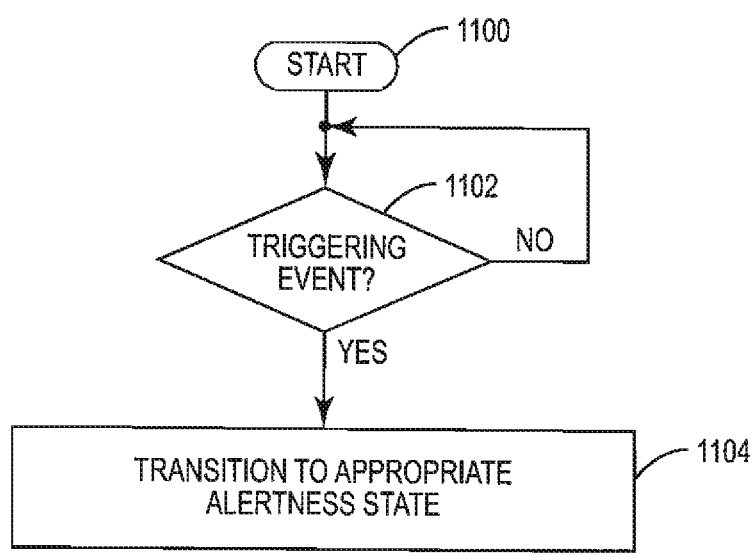
FIG. 12 is a more detailed illustration of one embodiment of a process performed by a wireless access node to control the duty cycle of the DTX/DRX mode of operation based on the alertness state of the wireless access node.

FIG. 12 is a flow chart illustrating the operation of the wireless access node 12 to control the duty cycle of the DTX/DRX mode of operation based on the alertness state of the wireless access node 12 according to one embodiment of the present disclosure. As illustrated, the wireless access node 12 starts in some initial alertness state (e.g., alertness state 0) (step 1100). The wireless access node 12 monitors for a triggering event (step 1102). If a triggering event is not detected, the wireless access node 12 continues to wait for a triggering event while operating in the same alertness state. If a triggering event is detected, the wireless access node 12 transitions to an appropriate alertness state in response to the triggering event (step 1104). The alertness state may be increased or decreased depending on the triggering event.

In one embodiment, the triggering event specifies an alertness state to which the wireless access node 12 is to transition. In another embodiment, the triggering event provides other parameters which are used by the wireless access node 12 to determine the alertness state to which to transition. For example, the triggering event may indicate that the UE 16 is an active UE located within the cell 14 covered by the wireless access node 12. In response, the wireless access node 12 transitions to the active state. As another example, the triggering event may indicate that the UE 16 is an active UE located in the cell 14 of a neighboring wireless access node 12. In response, the wireless access node 12 may transition to an intermediate alertness level.

In one scenario, if the wireless access node 12 is in the deep sleep state (e.g., alertness state 0), the triggering event is receipt of a wakeup signal. The wakeup signal may be from the UE 16, from another wireless access node 12, or from another network entity (e.g., a node in a higher level of a hierarchical network). For example, the UE 16 may periodically transmit a wakeup signal (e.g., a UE-specific or system-specific signature) during the DTX active intervals for the UE 16. The periodicity of the transmission from the UE 16 depends on the alertness state of the UE 16 and thus the duty cycle for the DTX/DRX mode of operation for the UE 16. The wireless access node 12 may then receive the wakeup signal during one of its DRX active intervals.

As another example, the wireless access node 12 may receive the wakeup signal from a neighboring wireless access node 12 via direct or indirect access node to access node communication (e.g., an X2 interface between LTE access nodes or base stations). The neighboring wireless access node 12 may send the wakeup signal in response to, for example, detecting an active UE 16 within the cell 14 served by the neighboring wireless access node 12. As yet another example, another network node may send the wakeup signal to the wireless access node 12 in response to, for example, determining that an active UE 16 is located within the cell 14 served by the wireless access node 12 or determining that an active UE 16 is located within the cell 14 served by a neighboring wireless access node 12.

As yet another example, the wakeup signal may be from a detection mechanism associated with the wireless access node 12 that operates to detect when one of the UEs 16 is located within the vicinity of the wireless access node 12. The detection mechanism may be, for example, a passive or active Radio Frequency Identification (RFID) reader, where an RFID tag is included in the UEs 16 and detected by the RFID reader associated with or included in the wireless access node 12 when the UE 16 is in the vicinity of the wireless access node 12. Thus, in this example, the UE 16 is in the vicinity of the wireless access node 12 when the RFID tag in the UE 16 is within range of the RFID reader of the wireless access node 12. Note that other detection mechanisms may alternatively be used.

Note that a wakeup signal is just one exemplary type of triggering event. Other types of triggering events may be network requests, requests from neighboring wireless access nodes 12, requests from one or more of the UEs 16, detection of one or more of the UEs 16 in the vicinity of the wireless access node 12, or the like. For example, if one of the UEs 16 is an active UE in the cell 14 of one of the neighboring wireless access nodes 12, the wireless access node 12 may receive a request from the neighboring wireless access node 12 to transition to an intermediate alertness state.

Figure 13:
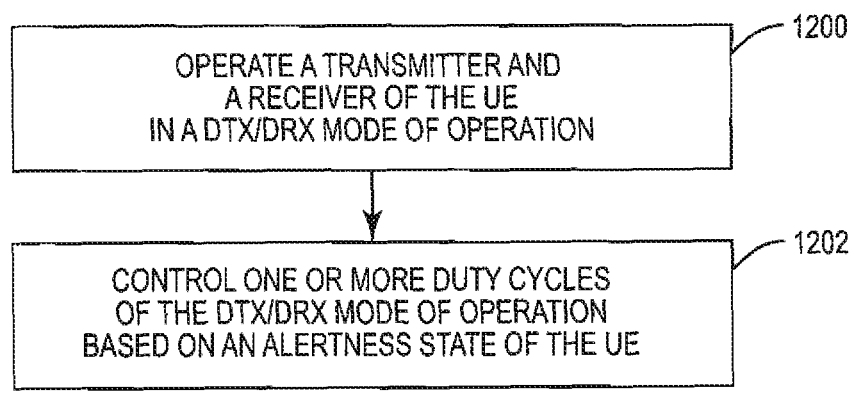
FIG. 13 is a flow chart that illustrates the operation of the UEs in the super dense network according to one embodiment of the present disclosure.

FIG. 13 is a flow chart illustrating the operation of the UE 16 according to one embodiment of the present disclosure. First, the UE 16 operates a transmitter and a receiver of the UE 16 in a DTX/DRX mode of operation (step 1200). The UE 16 then controls one or more duty cycles of the DTX/DRX mode of operation based on an alertness state of the UE 16 (step 1202). As such, as the alertness state of the UE 16 changes in response to triggering events, the UE 16 changes the duty cycle of the DTX/DRX mode of operation appropriately. As discussed above, this disclosure focuses on embodiments where the one or more duty cycles are a common duty cycle for the DTX active intervals and the DRX active intervals of the DTX/DRX mode of operation, where this common duty cycle is referred to as the duty cycle of the DTX/DRX mode of operation. However, the present disclosure is not limited thereto. The one or more duty cycles controlled by the UE 16 may be the duty cycle for the DTX active intervals, the duty cycle for the DRX active intervals, or both the duty cycle for the DTX active intervals and the duty cycle for the DRX active intervals.

Figure 14:
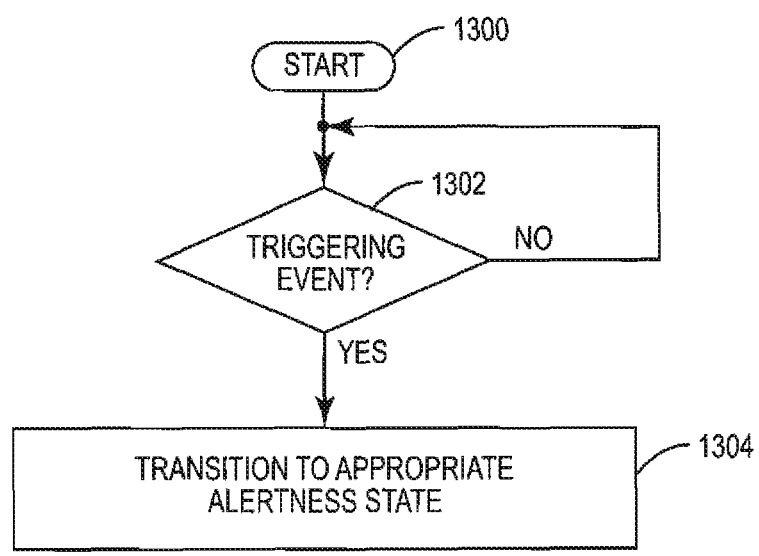
FIG. 14 is a more detailed illustration of one embodiment of a process performed by a UE to control the duty cycle of the DTX/DRX mode of operation based on the alertness state of the wireless access node.

FIG. 14 is a flow chart illustrating the operation of the UE 16 to control the duty cycle of the DTX/DRX mode of operation based on the alertness state of the UE 16 according to one embodiment of the present disclosure. As illustrated, the UE 16 starts in some initial alertness state (e.g., alertness state 0) (step 1300). The UE 16 monitors for a triggering event (step 1302). If a triggering event is not detected, the UE 16 continues to wait for a triggering event while operating in the same alertness state. If a triggering event is detected, the UE 16 transitions to an appropriate alertness state in response to the triggering event (step 1304). The alertness state may be increased or decreased depending on the triggering event. In one embodiment, the triggering event specifies an alertness state to which the UE 16 is to transition. In another embodiment, the triggering event provides other parameters which are used by the UE 16 to determine the alertness state to which to transition. For example, a wakeup signal may indicate that the UE 16 desires to actively send or receive data. In response, the UE 16 transitions to the active state.

In one scenario, if the UE 16 is in the deep sleep state (e.g., alertness state 0), the triggering event is receipt of a wakeup signal. The wakeup signal may be generated internally by the UE 16 in response to user activity or received from one of the wireless access nodes 12. For example, the wakeup signal may be generated internally by the UE 16 in response to user activity such as, for instance, sending a Multimedia Messaging Service (MMS) message, requesting web content via a web browser running on the UE 16, requesting multimedia content from a web service, or the like. As another example, one of the wireless access nodes 12 may periodically transmit a wakeup signal (e.g., a UE-specific or system-specific signature) during the DTX active intervals for the wireless access node 12. The periodicity of the transmission from the wireless access node 12 depends on the alertness state of the wireless access node 12 and thus the duty cycle for the DTX/DRX mode of operation for the wireless access node 12. The UE 16 may then receive the wakeup signal during one of its DRX active intervals. Note that a wakeup signal is just one exemplary type of triggering event. Other types of triggering events are, for example, a request from one of the wireless access nodes 12 to, for example, receive data, perform measurements, answer to paging, or the like; user activity; an absence of user activity; or the like.

Figure 15:
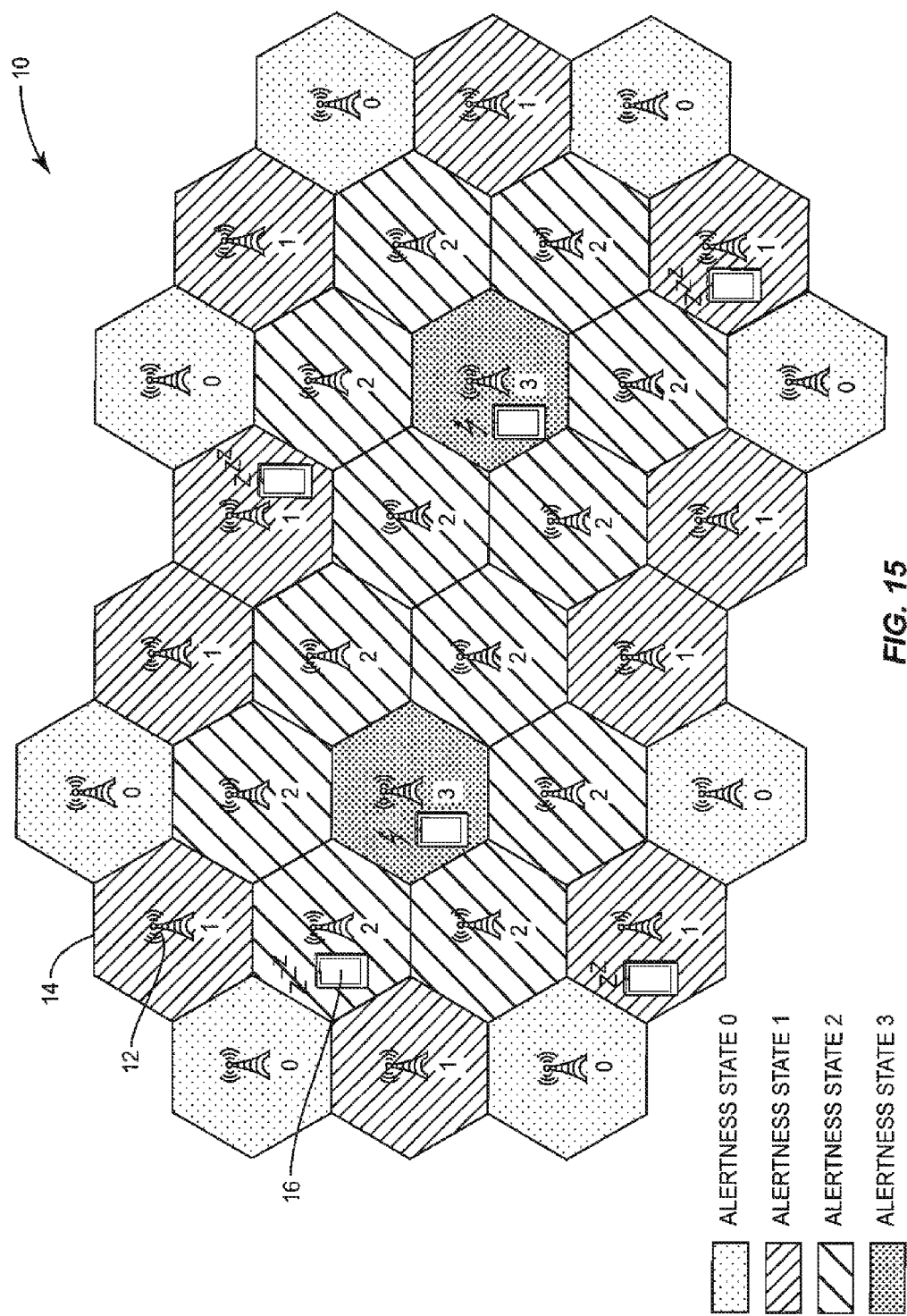
FIG. 15 illustrates an example of a super dense network and alertness states of the wireless access nodes in the super dense network according to one embodiment of the present disclosure.

FIG. 15 is a snap-shot of an exemplary embodiment of the super dense network 10 showing numerous wireless access nodes 12 and UEs 16 in various alertness states. As shown, the wireless access nodes 12 having active UEs 16 located within their corresponding cells 14 are in alertness state 3 (i.e., the active state). The wireless access nodes 12 that neighbor the wireless access nodes 12 in alertness state 3 are in alertness state 2. The alertness states of these neighboring wireless access nodes 12 is elevated to alertness state 2 due to the possibility that the active UEs 16 may move to the cells 14 of those neighboring wireless access nodes 12. Also, the wireless access nodes 12 serving the cells 14 in which inactive UEs 16 are located may be configured in alertness state 1. Note that some other wireless access nodes 12 are in alertness state 1 due to other rules.

Figure 16:
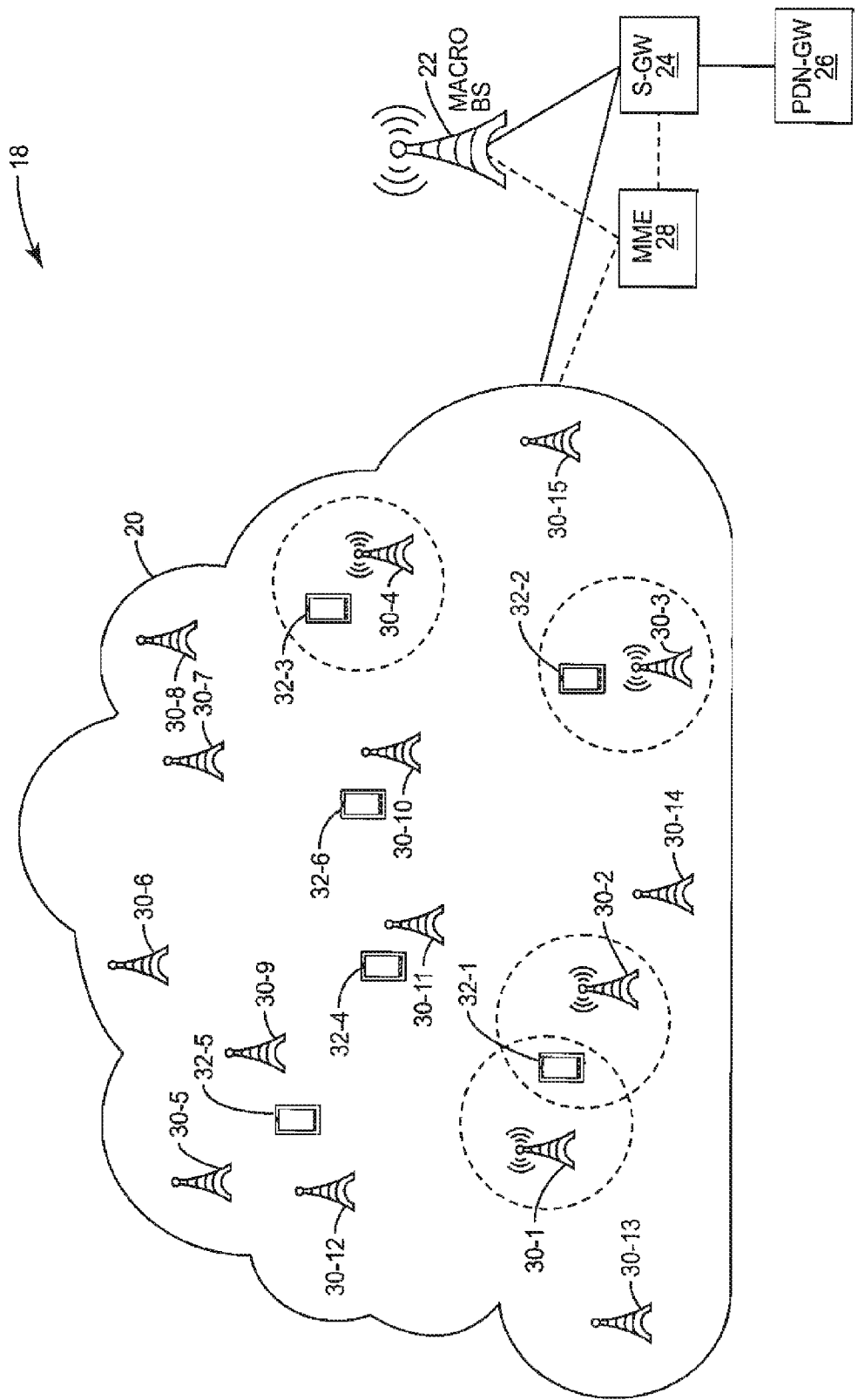
FIG. 16 illustrates a cellular communication network that includes an overlay network and a super dense network according to another embodiment of the present disclosure.

FIG. 16 illustrates a cellular communication network 18 that includes an overlay network and a super dense network 20 according to another embodiment of the present disclosure. More specifically, in this embodiment, the overlay network includes a number of macro base stations 22, a Serving Gateway (S-GW) 24, a Packet Data Network Gateway (PDN-GW) 26, and a Mobility Management Entity (MME) 28 connected as shown. As an example, the overlay network may be, or be similar to, a conventional cellular communication network (e.g., LTE or LTE-Advanced network, WiMAX network, or similar cellular communication network). The super dense network 20 is similar to the super dense network 10 described above. More specifically, the super dense network 20 includes a number of wireless access nodes 30-1 through 30-15 (generally referred to herein collectively as the wireless access nodes 30 and individually as wireless access node 30). UEs 32-1 through 32-6 (generally referred to herein collectively as the UEs 32 and individually as UE 32) are located within the super dense network 20. In this example, the wireless access nodes 30-1 through 30-4 are in the active state and are operating to serve active UEs 32-1, 32-2, and 32-3 located in the cells of the wireless access nodes 30-1 through 30-4.

The wireless access nodes 30 and the UEs 32 operate in a DTX/DRX mode of operation where, as described above, the duty cycles for the DTX/DRX mode of operation for the wireless access nodes 30 and the UEs 32 are controlled based on the alertness states of the wireless access nodes 30 and the UEs 32 in the manner described above. However, in this embodiment, the overlay network operates to, among other things, provide triggering events for transitions in the alertness states of the wireless access nodes 30 and, in some embodiments, the UEs 32. Note, however, that other types of triggering events may also be used to change the alertness states of the wireless access nodes 30 and/or the UEs 32.

Figure 17A:
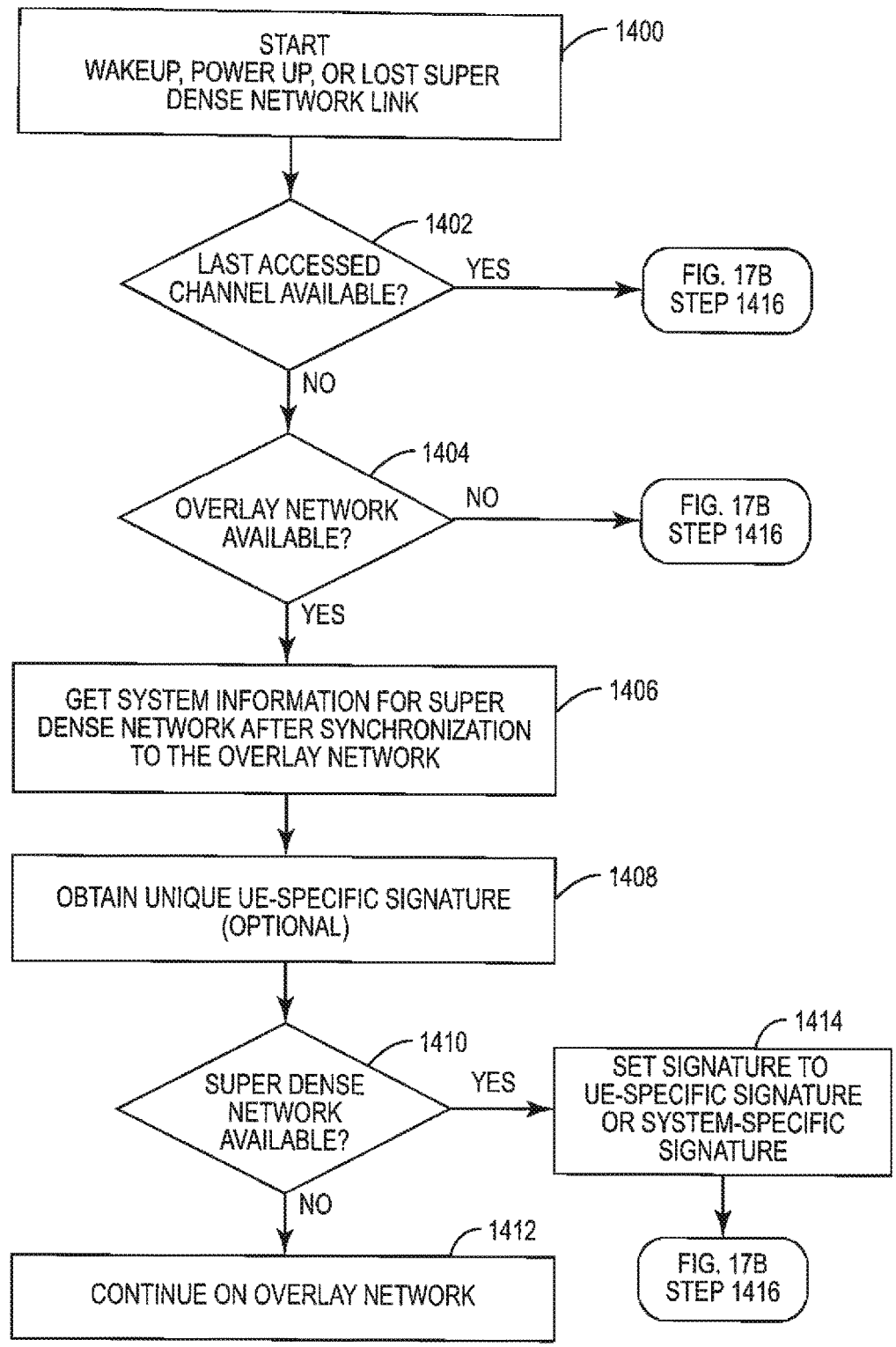
FIGS. 17A and 17B illustrate the operation of one of the UEs of FIG. 16 according to one embodiment of the present disclosure.
Figure 17B:
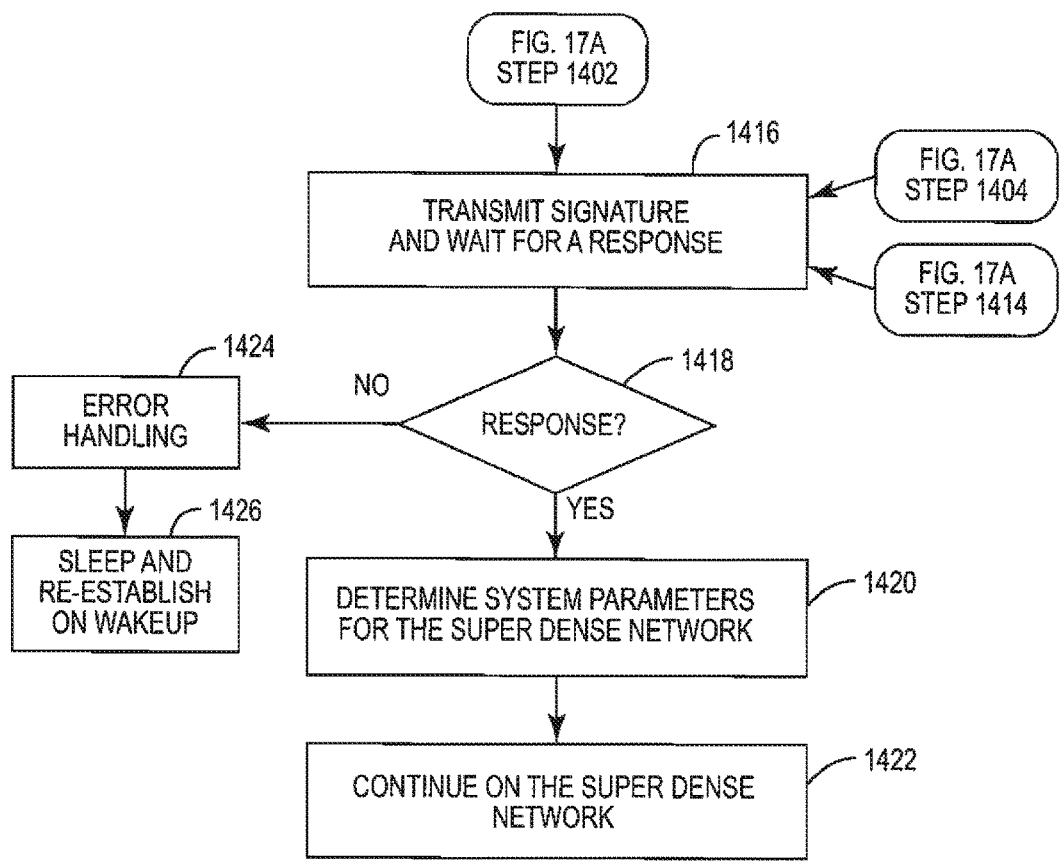

FIGS. 17A and 17B illustrate the operation of the UE 32 of FIG. 16 according to one embodiment of the present disclosure. The UE 32 starts in the deep sleep state and transitions out of the deep sleep state in response to a wakeup signal, a power up, or the loss of network connectivity to the super dense network 20 (step 1400). For convenience, each of these conditions will be referred to as a wakeup condition. Upon waking up, the UE 32 determines whether the last accessed channel, if any, to the super dense network 20 is available (step 1402). More specifically, the UE 32 stores a list of channels to the super dense network 20 that were most recently accessed by the UE 32. The UE 32 then determines whether any of those channels are available. If so, the process proceeds to step 1416, which is discussed below. If not, the UE 32 determines whether the overlay network is available (step 1404). Specifically, the UE 32 listens for a broadcast channel broadcast by the macro base station 22. If the overlay network is not available, the process proceeds to step 1416.

However, if the overlay network is available, then the UE 32 gets system information for the super dense network 20 from the macro base station 22 in the overlay network after synchronization to the overlay network (step 1406). Notably, synchronization to the overlay network may be performed using any suitable synchronization technique such as the synchronization techniques employed in conventional cellular communication networks. The system information may include, for example, channel information and timing correction information. In addition, the UE 32 may obtain a system-specific or UE-specific signature for the super dense network 20 from the macro base station 22 (step 1408).

Next, the UE 32 determines whether the super dense network 20 is available from the system information (step 1410). If not, the UE 32 continues operation on the overlay network (step 1412). However, if the super dense network 20 is available, the UE 32 sets the signature of the UE 32 to either the UE-specific signature or the system-specific signature, depending on the particular embodiment (step 1414). At this point, whether proceeding from step 1402, 1404, or 1414, the UE 32 transmits the signature and waits for a response (step 1416). The UE 32 determines whether a response is received from one of the wireless access nodes 30 (step 1418). If so, the UE 32 determines system parameters for the super dense network 20 (step 1420). These system parameters may include, for example, a secondary UE-specific signature to be used by the UE 32 for the super dense network 20. However, other system parameters may be obtained depending on the particular embodiment. The UE 32 then continues operation on the super dense network 20 (step 1422). Returning to step 1418, if a response is not received, the UE 32 performs an error handling procedure (step 1424) and, optionally, enters the deep sleep state and attempts to re-establish a network connection upon wakeup (step 1426).

Note that, in FIGS. 17A and 17B, the UE 32 has entered the active state upon wakeup in step 1400. After the network connection is established to the super dense network 20, the UE 32 may continue monitoring for triggering events and adjusting the duty cycle for the DTX/DRX mode of operation accordingly.

Figure 18:
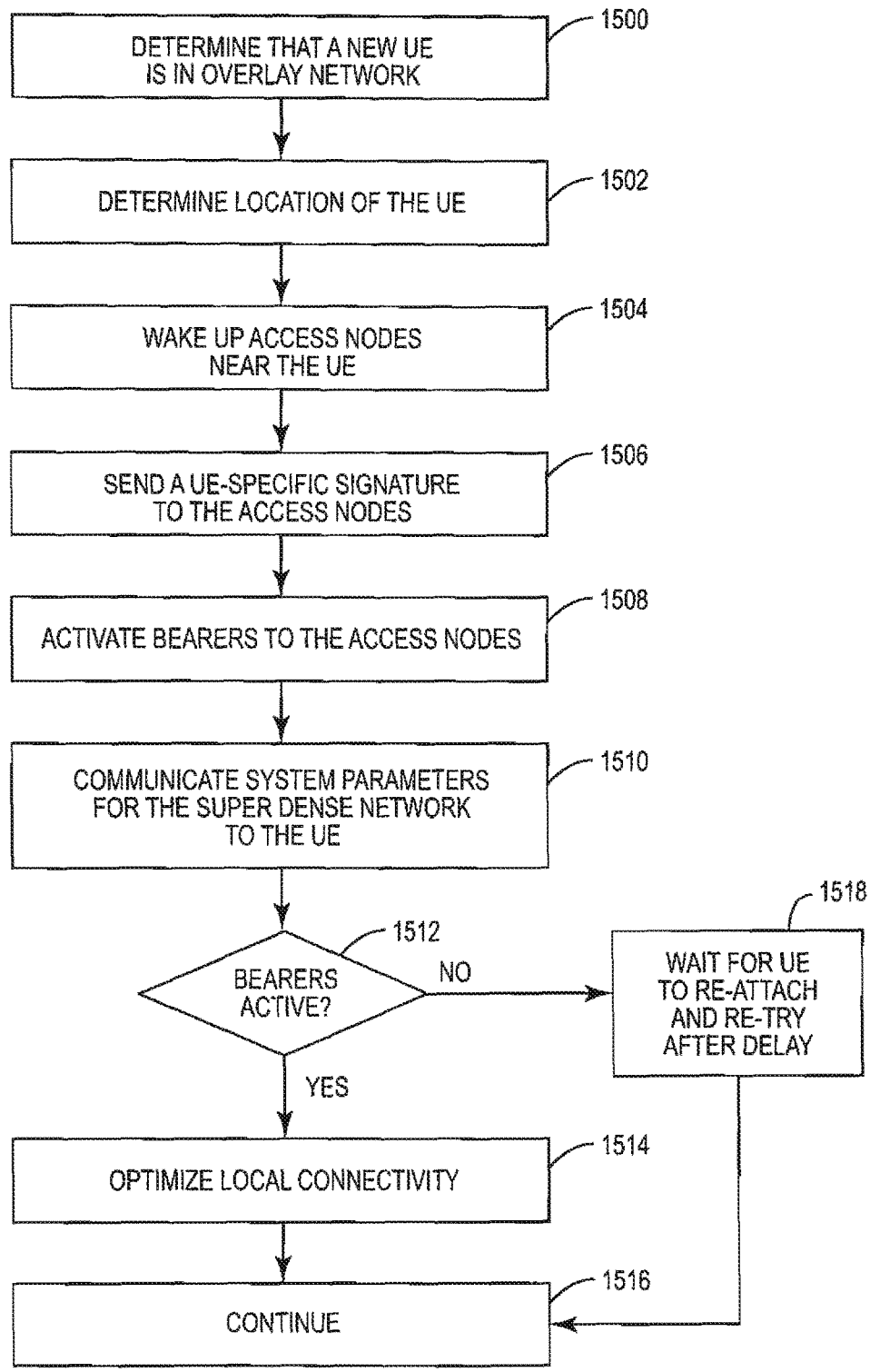
FIG. 18 illustrates the operation of the overlay network of FIG. 16 according to one embodiment of the present disclosure.

FIG. 18 is a flow chart illustrating the operation of the overlay network of FIG. 16 according to one embodiment of the present disclosure. First, the overlay network, and specifically the macro base station 22, determines that a new UE 32 is located in the overlay network (step 1500). The overlay network then determines a location of the UE 32 (step 1502). The location of the UE 32 may be determined using any suitable location determination scheme such as, for example, triangulation using multiple macro base stations 22, a Global Position System (GPS) of the UE 32, or the like. The MME 28 then wakes up one or more of the wireless access nodes 30 near the location of the UE 32 (step 1504). More specifically, the MME 28 sends wakeup signals to the wireless access nodes 30 near the location of the UE 32. For example, the wakeup signals may be sent to the wireless access node 30 that serves a cell that includes the location determined for the UE 32 in step 1502 and, optionally, one or more neighboring wireless access nodes 30 of that wireless access node 30. The wakeup signals may be such that the wireless access nodes 30 near the location of the UE 32 all transition to the active state. Alternatively, if the location of the UE 32 is sufficiently accurate, the wakeup signal to the wireless access node 30 serving the cell in which the UE 32 is located is such that the wireless access node 30 transitions to the active state. In contrast, the wakeup signals to the neighboring wireless access nodes 30 may be such that the neighboring wireless access nodes 30 transition to an intermediate alertness state. Optionally, the MME 28 sends a UE-specific signature for the UE 32 to the wireless access nodes 30 near the location of the UE 32 (step 1506).

Next, the MME 28 activates bearers from a transport network of the cellular communication network 18 to the wireless access nodes 30 near the location of the UE 32 (step 1508). The overlay network then communicates system parameters for the super dense network 20 to the UE 32 via the macro base station 22 (step 1510). The system parameters include channel information and timing correction information. In addition, the system parameters may include the UE-specific signature for the UE 32. The overlay network then determines whether the bearers to the wireless access nodes 30 are active (step 1512). If so, the MME 28 optimizes local connectivity for the UE 32 (step 1514). More specifically, the MME 28 activates new wireless access nodes 30 and/or deactivates wireless access nodes 30 based on the activity of the bearers in order to optimize connectivity for the UE 32. At this point, connectivity of the UE 32 to the super dense network 20 has been established, and operation continues in the normal manner (step 1516). Returning to step 1512, if the bearers are not active, the overlay network waits for the UE 32 to re-attach and re-try after a delay (step 1518). Once the UE 32 has successfully connected to the super dense network 20, the process proceeds to step 1516.

Figure 19A:
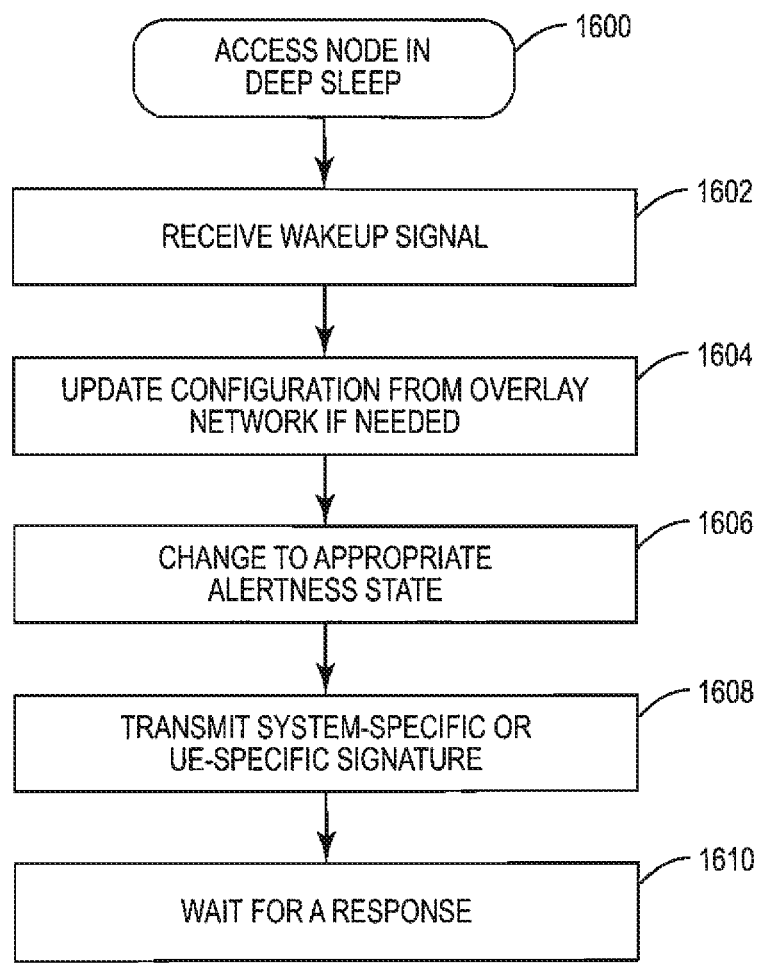
FIGS. 19A through 19C illustrate the operation of one of the wireless access nodes of FIG. 16 according to one embodiment of the present disclosure.
Figure 19B:
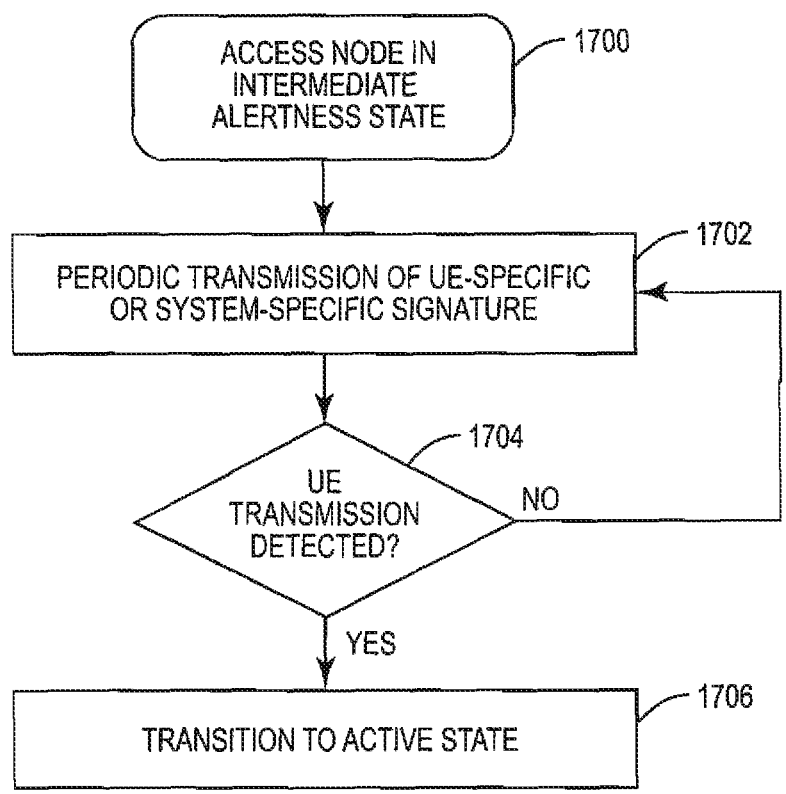
Figure 19C:
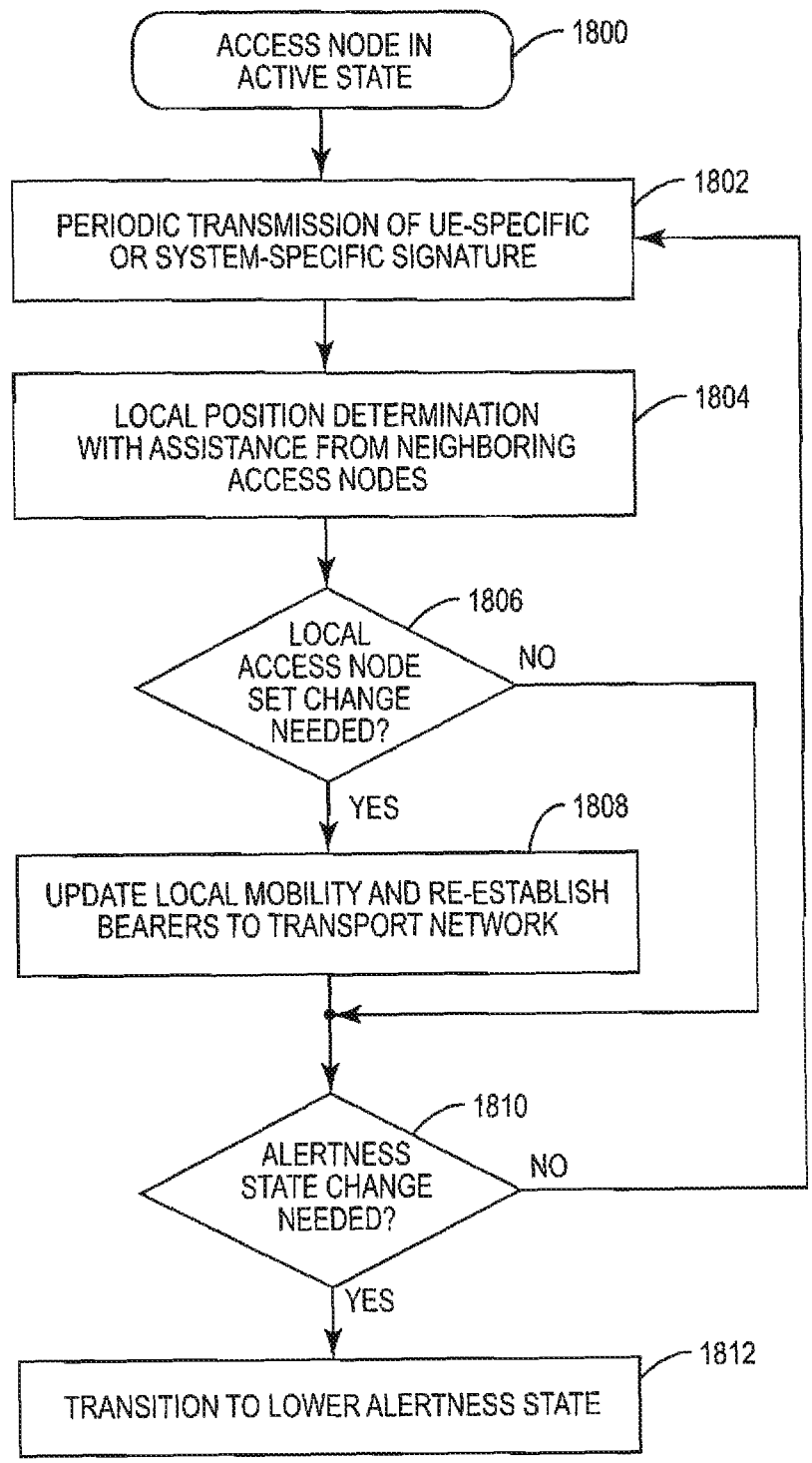

FIGS. 19A through 19C are flow charts that illustrate the operation of one of the wireless access nodes 30 in the super dense network 20 of FIG. 16 according to one embodiment of the present disclosure. More specifically, FIG. 19A illustrates the operation of the wireless access node 30 when transitioning from the deep sleep state to a higher alertness state according to one embodiment of the present disclosure. The process begins with the wireless access node 30 in the deep sleep state (step 1600). At some point, the wireless access node 30 receives a wakeup signal from the overlay network (step 1602). In response, the wireless access nodes 30 updates its configuration from the overlay network, if needed, (step 1604) and changes to the appropriate alertness state (step 1606). The wireless access node 30 then transmits a system-specific signature or a UE-specific signature depending on the particular embodiment (step 1608). The transmitted signature is the signature received from the overlay network in step 1506 of FIG. 18. The wireless access node 30 then waits for a response (step 1610). Notably, steps 1608 and 1610 may be repeated periodically according to the DTX/DRX duty cycle for the alertness state of the wireless access node 30.

FIG. 19B illustrates the operation of the wireless access node 30 when in an intermediate alertness state according to one embodiment of the present disclosure. The process begins with the wireless access node 30 in an intermediate alertness state (step 1700). The wireless access node 30 periodically transmits the UE-specific signature or the system-specific signature provided to the wireless access node 30 in step 1506 of FIG. 18 (step 1702) and determines whether a response from a UE 32 is received (step 1704). If not, the process returns to step 1702 and is repeated. Notably, steps 1702 and 1704 are performed in the DTX and DRX active intervals for the DTX/DRX mode of operation for the wireless access node 30 at the duty cycle for the alertness state of the wireless access node 30. Once a response is received, the wireless access node 30 transitions to the active state (step 1706).

FIG. 19C illustrates the operation of the wireless access node 30 when in the active state according to one embodiment of the present disclosure. The process begins with the wireless access node 30 in the active state (step 1800). The wireless access node 30 performs a periodic transmission of the UE-specific or system-specific signature (step 1802). This periodic transmission is performed at the duty cycle for the DTX/DRX mode of operation for the active state of the wireless access node 30. A local position determination process is performed with the assistance from the neighboring wireless access nodes 30 to more accurately determine the location of the UE 32 (step 1804). A determination is then made as to whether a change to a local access node defined to serve the UE 32 is needed (step 1806). If a change to the local access node set for the UE 32 is not needed, the process proceeds to step 1810. Otherwise, if a change is needed, a local mobility for the UE 32 is updated and bearers to the wireless access node 30 defined for the UE 32 after the update are re-established (step 1808). Note that steps 1804 through 1808 may be performed by the wireless access node 30 or by another network entity (e.g., the MME 28).

Next, whether proceeding from step 1806 or 1808, the wireless access node 30 determines whether an alertness state change is needed (step 1810). For example, if the local mobility update results in the wireless access node 30 being changed from a wireless access node 30 that serves the cell in which the UE 32 is located to a wireless access node 30 that serves a cell that neighbors the cell in which the UE 32 is located, then a determination may be made to decrease the alertness state of the wireless access node 30. If a change in the alertness state is not needed, the process returns to step 1802. If a change in the alertness state is needed, the wireless access node 30 transitions to a lower alertness state (step 1812).

In the embodiments above, the wireless access nodes 12, 30 are operated efficiently by changing the DTX and/or DRX duty cycles of the wireless access nodes 12, 30 in response to their alertness states. FIGS. 20 through 27 describe systems and methods for efficient operation of wireless access nodes in a low-load service area within a dense deployment of wireless access nodes in a cellular communication network. Notably, while the discussion below focuses on a low-load service area, the concepts are not limited to a low-load service area and are equally applicable to any suitable service area within a dense deployment of wireless access nodes in a cellular communication network. As used herein, a low-load service area is an area within an overall service area of the dense deployment of wireless access nodes in which all wireless access nodes are not needed to provide a desired data capacity. For example, the low-load service area may be an area within the overall service area of the dense deployment of wireless access nodes in which any and all wireless devices in the service area are idle or otherwise inactive. As another example, the low-load service area may be an area within the overall service area of the dense deployment of wireless access nodes in which, on average, the number of wireless devices that are active or expected to be active at any time and frequency is less than a predefined threshold. As another example, the low-load service area may be an area within the overall service area of the dense deployment of wireless access nodes in which, on average, the number of wireless devices that are in queue or expected to be in queue for service is less than a predefined threshold.

In general, in the embodiments described below, the dense deployment of wireless access nodes includes multiple wireless access nodes in a low-load service area. Overlapping radio coverage areas of the wireless access nodes in, or serving, the low-load service area are leveraged to enable efficient operation of the wireless access nodes in the low-load service area. In that regard, FIG. 20 illustrates a low-load service area 34 within a dense deployment of wireless access nodes (e.g., a super dense network) according to one embodiment of the present disclosure. The low-load service area 34 includes, or is served by, a number of wireless access nodes 36-1 through 36-19 (generally referred to herein collectively as the wireless access nodes 36 or individually as the wireless access node 36) that serve corresponding cells 38-1 through 38-19 (generally referred to herein as the cells 38 or individually as the cell 38) within the super dense network. Note that while there are nineteen wireless access nodes 36 and nineteen corresponding cells 38 in the low-load service area 34 illustrated in FIG. 20, it should be appreciated that the low-load service area 34 may include any number of wireless access nodes 36 having corresponding cells 38. The low-load service area 34 is a sub-area of an overall service area of the super-dense network in which all of the wireless access nodes 36 are not needed to provide desired data capacity for any and all UEs in the cells 38 of those wireless access nodes 36. In this example, UEs 40-1 and 40-2 in the cells 38-8 and 38-12 of the wireless access nodes 36-8 and 38-12 are either inactive (i.e., in alertness state 0) or in an intermediate alertness state (e.g., alertness state 1) and, as such, the wireless access nodes 36 are identified as serving a low-bad service area, which is the low-load service area 34.

Radio coverage areas of the wireless access nodes 36 extend beyond the corresponding cells 38 and overlap. The extension and overlap of the radio coverage areas of the wireless access nodes 36 is leveraged to provide radio coverage for a substantial portion of, and in one preferred embodiment an entirety of, the low-load service area 34 using only a subset of the wireless access nodes 36 in the low-load service area 34. The radio coverage provided by the subset of the wireless access nodes 36 can be used to provide one or more basic connectivity services, or basic connectivity maintenance, such as, for example, paging, synchronization, broadcasting and delivery of control messages, and/or the like.

More specifically, FIGS. 21 through 23 illustrate the operation of the wireless access nodes 36 to provide radio coverage for the low-load service area 34 using only a subset of the wireless access nodes 36 according to one embodiment of the present disclosure. As illustrated in FIG. 21, in this embodiment, the wireless access nodes 36-4, 36-5, 36-6, 36-12, 36-13, and 36-19 form a subset of the wireless access nodes 36 in the low-load service area 34 whose radio coverage areas, which are referred to as radio coverage areas 42-4, 42-5, 42-6, 42-12, 42-13, and 42-19 for consistency, provide radio coverage for a substantial portion of the low-load service area 34. In another embodiment, the radio coverage areas 42-4, 42-5, 42-6, 42-12, 42-13, and 42-19 encompass an entirety of the low-load service area 34. The subset of the wireless access nodes 36 in the low-load service area 34 are configured to operate in an intermediate alertness state and all of the other wireless access nodes in the low-load service area 34 operate in a lowest alertness state (i.e., alertness state 0). In this embodiment, alertness state 0 corresponds to a completely off state.

As discussed above, when configured in the intermediate alertness state, the wireless access nodes 36 in the subset of the wireless access nodes 36 operate in a DTX/DRX mode of operation having a predefined DTX duty cycle and a predefined DRX duty cycle. The DTX and DRX active intervals for the wireless access nodes 36 in the subset are preferably time-aligned. The radio coverage provided by the DTX and DRX active intervals of the subset of the wireless access nodes 36 can be used to provide one or more basic connectivity services, or basic connectivity maintenance, such as, for example, paging, synchronization, broadcasting and delivery of control messages, and/or the like.

FIGS. 22 and 23 illustrate DTX/DRX active intervals for the low-load service area 34 according to two embodiments of the present disclosure. More specifically, FIGS. 22 and 23 illustrate DTX/DRX active intervals for the subset of the wireless access nodes 36 in the low-load service area 34 of FIG. 21 as well as the time-alignment of the DTX/DRX active intervals for the subset of the wireless access nodes 36 and those of the UEs 40 in the low-load service area 34 for TDD and FDD operation, respectively, according to two exemplary embodiments of the present disclosure. In general, the DTX cycles and the DRX cycles for the wireless access nodes 36 in the subset of the wireless access nodes 36 and those of the UEs 40 in the low-load service area 34 are predefined such that, after synchronization of the wireless access nodes 36 and the UEs 40: (1) at least a subset of the DTX active intervals for the wireless access nodes 36 in the subset of the wireless access nodes 36 are time-aligned with a least a subset of the DRX active intervals for the UEs 40 and (2) at least a subset of the DRX active intervals for the wireless access nodes 36 are time-aligned with a least a subset of the DTX active intervals for the UEs 40. Even if the duty cycles for the wireless access nodes 36 and the UEs 40 are different, the DTX cycles and the DRX cycles are predefined such that at least some of the DTX active intervals of the wireless access nodes 36 are time-aligned with at least some of the DRX active intervals of the UEs 40 and at least some of the DRX active intervals of the wireless access nodes 36 are time-aligned with at least some of the DTX active intervals of the UEs 40.

More specifically, FIG. 22 illustrates DTX/DRX active intervals for the subset of the wireless access nodes 36 in the low-load service area 34 of FIG. 21 as well as the time-alignment of the DTX/DRX active intervals for the subset of the wireless access nodes 36 and those of the UEs 40 in the low-load service area 34 for TDD operation according to one embodiment of the present disclosure. As illustrated, in this particular example, the duty cycle for the DTX/DRX mode of operation of the wireless access nodes 36 in the subset of the wireless access nodes 36 (also referred to herein as the duty cycle for the low-load service area 34) is the same as the duty cycle for the DTX/DRX mode of operation of the UEs 40 in the low-load service area 34. However, the present disclosure is not limited thereto. The duty cycle for the DTX/DRX mode of operation of the wireless access nodes 36 in the subset of the wireless access nodes 36 may alternatively be greater than or even less than that of the UEs 40. In this particular example, each DTX active interval of the wireless access nodes 36 is time-aligned with a corresponding DRX active interval for the UEs 40. As such, during those periods of time, signals transmitted by the wireless access nodes 36 in the subset of the wireless access nodes 36 can be received by the UEs 40 in the low-load service area 34. Similarly, in this particular example, each DRX active interval of for the wireless access nodes 36 in the subset of the wireless access nodes 36 is time-aligned with a corresponding DTX active interval for the UEs 40 in the low-load service area 34. As such, during those periods of time, signals transmitted by the UEs 40 can be received by the wireless access nodes 36 in the subset of the wireless access nodes 36.

FIG. 23 illustrates DTX/DRX active intervals for the subset of the wireless access nodes 36 in the low-load service area 34 of FIG. 21 as well as the time-alignment of the DTX/DRX active intervals for the subset of the wireless access nodes 36 and those of the UEs 40 in the low-load service area 34 for FDD operation according to one embodiment of the present disclosure. As illustrated, in this particular example, the duty cycle for the DTX/DRX mode of operation of the wireless access nodes 36 in the subset of the wireless access nodes 36 (also referred to herein as the duty cycle for the low-load service area 34) is the same as the duty cycle for the DTX/DRX mode of operation of the UEs 40 in the low-load service area 34. However, the present disclosure is not limited thereto. The duty cycle for the DTX/DRX mode of operation of the wireless access nodes 36 in the subset of the wireless access nodes 36 may alternatively be greater than or even less than that of the UEs 40. In this particular example, each DTX active interval for the wireless access nodes 36 in the subset of the wireless access nodes 36 is time and frequency aligned with a corresponding DRX active interval for the UEs 40 in the low-load service area 34. As such, during those periods of time, signals transmitted by the wireless access nodes 36 in the subset of the wireless access nodes 36 can be received by the UEs 40 in the low-load service area 34. Similarly, in this particular example, each DRX active interval for the wireless access nodes 36 in the subset of the wireless access nodes 36 is time and frequency aligned with a corresponding DTX active interval for the UEs 40 in the low-load service area 34. As such, during those periods of time, signals transmitted by the UEs 40 can be received by the wireless access nodes 36 in the subset of the wireless access nodes 36.

While in the embodiments of FIGS. 21 through 23 the same subset of the wireless access nodes 36 is active during all of the DTX active intervals and the DRX active intervals for the low-load service area 34, the present disclosure is not limited thereto. In another embodiment, different subsets of the wireless access nodes 36 in the low-load service area 34 may be active for different DTX active intervals, and different subsets of the wireless access nodes 36 in the low-load service area 34 may be active for different DRX active intervals.

In this regard, FIGS. 24A through 24C illustrate the operation of the wireless access nodes 36 in the low-load service area 34 such that different subsets of the wireless access nodes 36 are active during different DTX/DRX active intervals for the low-load service area 34 according to another embodiment of the present disclosure. As illustrated in FIGS. 24A through 24C, a first subset of the wireless access nodes 36 (FIG. 24A) is active during some DTX and DRX active intervals, a second subset of the wireless access nodes 36 (FIG. 24B) is active during DTX and DRX active intervals that are different than those in which the first subset of the wireless access nodes 36 is active, and a third subset of the wireless access nodes 36 (FIG. 24C) is active during DTX and DRX active intervals that are different than those in which either the first or second subset of the wireless access nodes 36 is active. Together, the DTX/DRX active intervals of the different subsets of the wireless access nodes 36 provide a desired DTX duty cycle and a desired DRX duty cycle for the low-load service area 34. Note that while there are three subsets of the wireless access nodes 36 in the example of FIGS. 24A through 24C, there may be any number of two or more subsets. Further, one or more of the wireless access nodes 36 may be included in more than one of the subsets of the wireless access nodes 36. By using different subsets of the wireless access nodes 36 for different DTX/DRX active intervals, efficiency can be distributed among the wireless access nodes 36 in the low-load service area 34. In contrast, in the embodiments of FIGS. 21 through 23, efficiency is localized to the wireless access nodes 36 that are continuously inactive for all of the DTX/DRX active intervals.

More specifically, as illustrated in FIG. 24A, the wireless access nodes 36-4, 36-5, 36-6, 36-12, 36-13, and 36-19 form the first subset of the wireless access nodes 36 in the low-load service area 34 whose radio coverage areas, which are referred to as the radio coverage areas 42-4, 42-5, 42-6, 42-12, 42-13, and 42-19 for consistency, provide radio coverage for a substantial portion of the low-load service area 34. In another embodiment, the radio coverage areas 42-4, 42-5, 42-6, 42-12, 42-13, and 42-19 encompass an entirety of the low-load service area 34. As illustrated in FIG. 24B, the wireless access nodes 36-1, 36-7, 36-8, 36-14, 36-15, and 36-16 form the second subset of the wireless access nodes 36 in the low-load service area 34 whose radio coverage areas, which are referred to as radio coverage areas 42-1, 42-7, 42-8, 42-14, 42-15, and 42-16 for consistency, provide radio coverage for a substantial portion of the low-load service area 34. In another embodiment, the radio coverage areas 42-1, 42-7, 42-8, 42-14, 42-15, and 42-16 encompass an entirety of the low-load service area 34. Lastly, as illustrated in FIG. 24C, the wireless access nodes 36-2, 36-3, 36-9, 36-10, 36-11, 36-17, and 36-18 form the third subset of the wireless access nodes 36 in the low-load service area 34 whose radio coverage areas, which are referred to as radio coverage areas 42-2, 42-3, 42-9, 42-10, 42-11, 42-17, and 42-18 for consistency, provide radio coverage for a substantial portion of the low-load service area 34. In another embodiment, the radio coverage areas 42-2, 42-3, 42-9, 42-10, 42-11, 42-17, and 42-18 encompass an entirety of the low-load service area 34.

In this embodiment, all of the wireless access nodes 36 in the low-load service area 34 are in one of the three subsets of the wireless access nodes 36. Further, all of the wireless access nodes 36 are configured to operate in an intermediate alertness state. For each subset of the wireless access nodes 36, the wireless access nodes 36 in the subset of the wireless access nodes 36 have the same DTX active intervals and the same DRX active intervals (i.e., the DTX active intervals are time-aligned and the DRX active intervals are time-aligned). However, each subset of the wireless access nodes 36 has different DTX and DRX active intervals such that together the different DTX and DRX active intervals of the subsets of the wireless access nodes 36 provide a desired DTX duty cycle for the low-load service area 34 and a desired DRX duty cycle for the low-load service area 34. The radio coverage provided by the DTX and DRX active intervals of the subsets of the wireless access nodes 36 can be used to provide one or more basic connectivity services, or basic connectivity maintenance, such as, for example, paging, synchronization, broadcasting and delivery of control messages, and/or the like.

FIGS. 25 and 26 illustrate DTX/DRX active intervals for three subsets of wireless access nodes 36 of FIGS. 24A through 24C that together provide a desired DTX/DRX duty cycle for the low-load service area 34 according to two embodiments of the present disclosure. More specifically, FIGS. 25 and 26 illustrate DTX/DRX active intervals for the subsets of the wireless access nodes 36 in FIGS. 24A through 24C as well as the time-alignment of the DTX/DRX active intervals for the subsets of the wireless access nodes 36 and those of the UEs 40 in the low-load service area 34 for TDD and FDD operation, respectively, according to two exemplary embodiments of the present disclosure. In general, the DTX cycles and the DRX cycles for the wireless access nodes 36 in the subsets of the wireless access nodes 36 and those of the UEs 40 in the low-load service area 34 are predefined such that, after synchronization of the wireless access nodes 36 and the UEs 40: (1) at least a subset of the DTX active intervals for the wireless access nodes 36 in the subsets of the wireless access nodes 36 are time-aligned with a least a subset of the DRX active intervals for the UEs 40 and (2) at least a subset of the DRX active intervals for the wireless access nodes 36 in the subsets of the wireless access nodes 36 are time-aligned with a least a subset of the DTX active intervals for the UEs 40. Even if the DTX/DRX duty cycles for the low-load service area 34 (i.e., the combined DTX/DRX duty cycles of the subsets of the wireless access nodes 36) and the DTX/DRX duty cycles for the UEs 40 are different, the DTX cycles and the DRX cycles are predefined such that at least some of the DTX active intervals of the wireless access nodes 36 in the subsets of the wireless access nodes 36 are time-aligned with at least some of the DRX active intervals of the UEs 40 and at least some of the DRX active intervals of the wireless access nodes 36 in the subsets of the wireless access nodes 36 are time-aligned with at least some of the DTX active intervals of the UEs 40.

More specifically, FIG. 25 illustrates DTX/DRX active intervals for the subsets of the wireless access nodes 36 of FIGS. 24A and 24B as well as the time-alignment of the DTX/DRX active intervals for the subsets of the wireless access nodes 36 and those of the UEs 40 in the low-load service area 34 for TDD operation according to one embodiment of the present disclosure. As illustrated, the different subsets of the wireless access nodes 36 have different DTX/DRX active intervals. Together, the DTX/DRX active intervals of the different subsets of the wireless access nodes 36 are referred to herein as the DTX/DRX active intervals for the low-load service area 34 and are configured to provide a desired DTX and DRX duty cycles for the low-load service area 34.

As illustrated, in this particular example, the DTX and DRX duty cycles for the low-load service area 34 (i.e., the DTX and DRX duty cycles provided by the aggregate, or combination, of the DTX and DRX duty cycles for the subsets of the wireless access nodes 36) is the same as the DTX and DRX duty cycles for the UEs 40 in the low-load service area 34. However, the present disclosure is not limited thereto. Further, in this particular example, each DTX active interval of the low-load service area 34 is time-aligned with a corresponding DRX active interval for the UEs 40. As such, during those periods of time, signals transmitted by the wireless access nodes 36 in the corresponding subset of the wireless access nodes 36 can be received by the UEs 40 in the low-load service area 34. Similarly, in this particular example, each DRX active interval for the low-load service area 34 is time-aligned with a corresponding DTX active interval for the UEs 40 in the low-load service area 34. As such, during those periods of time, signals transmitted by the UEs 40 can be received by the wireless access nodes 36 in the corresponding subset of the wireless access nodes 36.

FIG. 26 illustrates DTX/DRX active intervals for the subsets of the wireless access nodes 36 of FIGS. 24A and 24B as well as the time-alignment of the DTX/DRX active intervals for the subsets of the wireless access nodes 36 and those of the UEs 40 in the low-load service area 34 for FDD operation according to one embodiment of the present disclosure. As illustrated, the different subsets of the wireless access nodes 36 have different DTX/DRX active intervals. Together, the DTX/DRX active intervals of the different subsets of the wireless access nodes 36 are referred to herein as the DTX/DRX active intervals for the low-load service area 34 and are configured to provide a desired DTX and DRX duty cycles for the low-load service area 34.

As illustrated, in this particular example, the DTX and DRX duty cycles for the low-load service area 34 (i.e., the DTX and DRX duty cycles provided by the aggregate, or combination, of the DTX and DRX duty cycles for the subsets of the wireless access nodes 36) is the same as the DTX and DRX duty cycles for the UEs 40 in the low-load service area 34. However, the present disclosure is not limited thereto. Further, in this particular example, each DTX active interval of the low-load service area 34 is time and frequency aligned with a corresponding DRX active interval for the UEs 40. As such, during those periods of time, signals transmitted by the wireless access nodes 36 in the corresponding subset of the wireless access nodes 36 can be received by the UEs 40 in the low-load service area 34. Similarly, in this particular example, each DRX active interval of for low-load service area 34 is time and frequency aligned with a corresponding DTX active interval for the UEs 40 in the low-load service area 34. As such, during those periods of time, signals transmitted by the UEs 40 can be received by the wireless access nodes 36 in the corresponding subset of the wireless access nodes 36.

FIG. 27 is a flow chart that illustrates a process for configuring the wireless access nodes 36 in the low-load service area 34 according to one embodiment of the present disclosure. This process may be performed by any suitable node in the super dense network or a higher-level network in a network hierarchy (e.g., a node in an overlay network), which is referred to herein as a control node. First, the control node identifies the low-load service area (step 1900). More specifically, the control node identifies a contiguous group of wireless access nodes in the super dense network that serve an area in which all of those wireless access nodes are not needed to provide the desired data capacity. For example, the control node may identify a contiguous group of wireless access nodes that are serving only UEs in alertness state 0 or some intermediate alertness state or, in other words, a contiguous group of wireless access nodes that are not serving any active UEs. The service area of the identified wireless access nodes is identified as the low-load service area 34, where the identified wireless access nodes are the wireless access nodes 36 in the low-load service area 34.

Next, the control node configures the wireless access nodes 36 in the low-load service area 34 such that only a subset of the wireless access nodes 36 in the low-load service area 34 are active for each DTX active interval and each DRX active interval for the wireless access nodes 36 in the low-load service area 34 (step 1902). As discussed above, in one embodiment, the same subset of the wireless access nodes 36 in the low-load service area 34 is active for all DTX and DRX active intervals for the low-load service area 34. In another embodiment, different subsets of the wireless access nodes 36 in the low-load service area 34 are active for different DTX and DRX active intervals. The subset(s) of the wireless access nodes 36 provide radio coverage for the low-load service area 34 for each DTX and DRX active interval of the low-load service area 34. This radio coverage enables, for example, basic connectivity services for the low-load service area 34 using only the subset(s) of the wireless access nodes 36 in the low-load service area 34.

FIG. 28 is a block diagram of a wireless access node 44 according to one embodiment of the present disclosure. The wireless access node 44 is either one of the wireless access nodes 12 of FIG. 1, one of the wireless access nodes 30 of FIG. 16, or one of the wireless access nodes 36 of FIGS. 20, 21, and 24A through 24C. As illustrated, the wireless access node 44 includes one or more transceiver subsystems 46 and a processing subsystem 48. One of the one or more transceiver subsystems 46 generally includes analog and, in some embodiments, digital components for sending and receiving data to and from UEs within the cell of the wireless access node 44. In addition, the one or more transceiver subsystems 46 may include one or more additional transceiver subsystems 46 for sending data to or receiving data from other wireless access nodes 44 and/or sending data to and receiving data from an overlay network such as that in FIG. 16. From a wireless communications protocol view, the one or more transceiver subsystems 46 implement at least part of Layer 1 (i.e., the Physical or "PHY" Layer). The processing subsystem 48 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the one or more transceiver subsystems 46 and the processing subsystem 48, will vary depending on both the particular implementation as well as the standard or standards supported by the wireless access node 44.

FIG. 29 is a block diagram of a UE 50 according to one embodiment of the present disclosure. The UE 50 is either one of the UEs 16 of FIG. 1, one of the UEs 32 of FIG. 16, or one of the UEs 40 of FIGS. 20, 21, and 24A through 24C. As illustrated, the UE 50 includes a transceiver subsystem 52 and a processing subsystem 54. The transceiver subsystem 52 generally includes analog and, in some embodiments, digital components for sending and receiving data to and from the wireless access nodes 12, 30, 36 and, in the embodiment of FIG. 16, the macro base stations 22 in the overlay network. From a wireless communications protocol view, the transceiver subsystem 52 implements at least part of Layer 1 (i.e., the Physical or "PHY" Layer). The processing subsystem 54 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 52 and the processing subsystem 54, will vary depending on both the particular implementation as well as the standard or standards supported by the UE 50.

FIG. 30 is a block diagram of a control node 56 that operates to perform the process of FIG. 27 according to one embodiment of the present disclosure. As illustrated, the control node 56 includes one or more transceiver subsystems 58 and a processing subsystem 60. One of the one or more transceiver subsystems 58 generally includes analog and, in some embodiments, digital components for sending and receiving data to and from wireless access nodes and/or sending data to and receiving data from an overlay network such as that in FIG. 16. From a wireless communications protocol view, the one or more transceiver subsystems 58 implement at least part of Layer 1 (i.e., the Physical or "PHY" Layer). The processing subsystem 60 generally implements any remaining portion of Layer 1 as well as functions for higher layers in the wired or wireless communications protocol (e.g., Layer 2 (data link layer), Layer 3 (network layer), etc.). Of course, the detailed operation for each of the functional protocol layers, and thus the one or more transceiver subsystems 58 and the processing subsystem 60, will vary depending on both the particular implementation as well as the standard or standards supported by the control node 56.

Those skilled in the art will appreciate that the block diagrams of the wireless access node 44, the UE 50, and the control node 56 in FIGS. 28 through 30 necessarily omit numerous features that are not necessary to a complete understanding of this disclosure. For instance, although all of the details of the processing subsystems 48, 54, and 60 are not illustrated, those skilled in the art will recognize that the processing subsystems 48, 54, and 60 comprise one or several general-purpose or special-purpose microprocessors or other microcontrollers programmed with suitable software and/or firmware to carry out some or all of the functionality of the wireless access node 44, the UE 50, and the control node 56 described herein. In addition or alternatively, the processing subsystems 48, 54, and 60 may comprise various digital hardware blocks (e.g., one or more Application Specific Integrated Circuits (ASICs), one or more off-the-shelf digital and analog hardware components, or a combination thereof) configured to carry out some or all of the functionality of the wireless access node 44, the UE 50, and the control node 56 described herein.

The following acronyms are used throughout this disclosure.

ASIC Application Specific Integrated Circuit
DRX Discontinuous Receive
DTX Discontinuous Transmit
FDD Frequency Division Duplex
GPS Global Positioning System
H-FDD Half-Duplex Frequency-Division Duplex
LTE Long Term Evolution
MME Mobility Management Entity
MMS Multimedia Messaging Service
PDN-GW Packet Data Network Gateway
RFID Radio Frequency Identification
S-GW Serving Gateway
TDD Time Division Duplex
UE User Equipment Device Those skilled in the art will recognize improvements and modifications to the preferred embodiments of the present disclosure. All such improvements and modifications are considered within the scope of the concepts disclosed herein and the claims that follow.

What is claimed is:

1. A cellular communication network comprising:
a dense deployment of base stations, the dense deployment of base stations comprising a plurality of base stations in a service area;
wherein:
a subset of the plurality of base stations in the service area are active during each of a plurality of discontinuous transmit active intervals for the plurality of base stations in the service area, and a subset of the plurality of base stations in the service area are active during each of a plurality of discontinuous receive active intervals for the plurality of base stations in the service area;
different subsets of the plurality of base stations in the service area are active during different discontinuous transmit active intervals of the plurality of discontinuous transmit active intervals for the plurality of base stations in the service area, and different subsets of the plurality of base stations in the service area are active during different discontinuous receive active intervals of the plurality of discontinuous receive active intervals for the plurality of base stations in the service area;
there are N different subsets of the plurality of base stations in the service area that are active during the different discontinuous transmit active intervals where subset i of the N different subsets is active every N-th discontinuous transmit active interval starting at an i-th discontinuous transmit active interval where i=1 . . . N; and
there are M different subsets of the plurality of base stations in the service area that are active during the different discontinuous receive active intervals where subset j of the M different subsets is active every M-th discontinuous receive active interval starting at a j-th discontinuous receive active interval where j=1 . . . M.

2. The cellular communication network of claim 1 wherein the service area is a low-load service area.

3. The cellular communication network of claim 1 wherein the subset of the plurality of base stations in the service area that is active during the plurality of discontinuous transmit active intervals for the plurality of base stations in the service area is the same as the subset of the plurality of base stations in the service area that is active during the plurality of discontinuous receive active intervals for the plurality of base stations in the service area.

4. The cellular communication network of claim 3 wherein each of the subset of the plurality of base stations provides one or more basic services for an entirety of the service area.

5. The cellular communication network of claim 4 wherein each base station in the subset of the plurality of base stations has a discontinuous transmit duty cycle that is greater than a predefined minimum discontinuous transmit duty cycle and less than a predefined maximum discontinuous transmit duty cycle and a discontinuous receive duty cycle that is greater than a predefined minimum discontinuous receive duty cycle and less than a predefined maximum discontinuous receive duty cycle, and all other base stations of the plurality of base stations in the service area are completely inactive.

6. The cellular communication network of claim 1 wherein the different subsets of the plurality of base stations in the service area that are active during the different discontinuous transmit active intervals and the different subsets of the plurality of base stations in the service area that are active during the different discontinuous receive active intervals provide one or more basic services for an entirety of the service area.

7. The cellular communication network of claim 6 wherein each base station in each of the different subsets of the plurality of base stations in the service area that are active during the different discontinuous transmit active intervals has a discontinuous transmit duty cycle that is greater than a predefined minimum discontinuous transmit duty cycle and less than a predefined maximum discontinuous transmit duty cycle, and each base station in each of the different subsets of the plurality of base stations in the service area that are active during the different discontinuous receive active intervals has a discontinuous receive duty cycle that is greater than a predefined minimum discontinuous receive duty cycle and less than a predefined maximum discontinuous receive duty cycle, and any other base stations of the plurality of base stations in the service area are completely inactive.

8. The cellular communication network of claim 1 wherein the different subsets of the plurality of base stations in the service area that are active during the different discontinuous transmit active intervals are configured to collectively achieve a discontinuous transmit duty cycle for the plurality of base stations in the service area, and the different subsets of the plurality of base stations in the service area that are active during the different discontinuous receive active intervals are configured to collectively achieve a discontinuous receive duty cycle for the plurality of base stations in the service area.

9. A control node for a dense deployment of base stations in a cellular communication network comprising:
   a transceiver; and
   a processing subsystem comprising one or more processors, the processing subsystem associated with the transceiver configured to:
   identify, within the dense deployment of base stations, a plurality of base stations in a service area;
   control the plurality of base stations in the service area such that a subset of the plurality of base stations in the service area are active during each of a plurality of discontinuous transmit active intervals for the plurality of base stations in the service area, and a subset of the plurality of base stations in the service area are active during each of a plurality of discontinuous receive active intervals for the plurality of base stations in the service area;
   control the plurality of base stations in the service area such that different subsets of the plurality of base stations in the service area are active during different discontinuous transmit active intervals of the plurality of discontinuous transmit active intervals for the plurality of base stations in the service area, and different subsets of the plurality of base stations in the service area are active during different discontinuous receive active intervals of the plurality of discontinuous receive active intervals for the plurality of base stations in the service area;
   control the plurality of base stations in the service area such that:
      there are N different subsets of the plurality of base stations in the service area that are active during the different discontinuous transmit active intervals where subset i of the N different subsets is active every N-th discontinuous transmit active interval starting at an i-th discontinuous transmit active interval where i=1 . . . N; and
      there are M different subsets of the plurality of base stations in the service area that are active during the different discontinuous receive active intervals where subset j of the M different subsets is active every M-th discontinuous receive active interval starting at a j-th discontinuous receive active interval where j=1 . . . M.

10. The control node of claim 9 wherein the service area is a low-load service area.

11. The control node of claim 9 wherein the processing subsystem is further configured to control the plurality of base stations in the service area such that the subset of the plurality of base stations in the service area that is active during the plurality of discontinuous transmit active intervals for the plurality of base stations in the service area is the same as the subset of the plurality of base stations in the service area that is active during the plurality of discontinuous receive active intervals for the plurality of base stations in the service area.

12. The control node of claim 11 wherein each of the subset of the plurality of base stations provides one or more basic services for an entirety of the service area.

13. The control node of claim 12 wherein the processing subsystem is further configured to control the plurality of base stations in the service area such that each base station in the subset of the plurality of base stations has a discontinuous transmit duty cycle that is greater than a predefined minimum discontinuous transmit duty cycle and less than a predefined maximum discontinuous transmit duty cycle and a discontinuous receive duty cycle that is greater than a predefined minimum discontinuous receive duty cycle and less than a predefined maximum discontinuous receive duty cycle, and all other base stations of the plurality of base stations in the service area are completely inactive.

14. The control node of claim 9 wherein the different subsets of the plurality of base stations in the service area that are active during the different discontinuous transmit active intervals and the different subsets of the plurality of base stations in the service area that are active during the different discontinuous receive active intervals provide one or more basic services for an entirety of the service area.

15. The control node of claim 14 wherein the processing subsystem is further configured to control the plurality of base stations in the service area such that:
   each base station in each of the different subsets of the plurality of base stations in the service area that are active during the different discontinuous transmit active intervals has a discontinuous transmit duty cycle that is greater than a predefined minimum discontinuous transmit duty cycle and less than a predefined maximum discontinuous transmit duty cycle;
   each base station in each of the different subsets of the plurality of base stations in the service area that are active during the different discontinuous receive active intervals has a discontinuous receive duty cycle that is greater than a predefined minimum discontinuous receive duty cycle and less than a predefined maximum discontinuous receive duty cycle; and
   any other base stations of the plurality of base stations in the service area are completely inactive.

16. The control node of claim 9 wherein the processing subsystem is further configured to control the plurality of base stations in the service area such that:
   the different subsets of the plurality of base stations in the service area that are active during the different discontinuous transmit active intervals collectively achieve a discontinuous transmit duty cycle for the plurality of base stations in the service area; and
   the different subsets of the plurality of base stations in the service area that are active during the different discontinuous receive active intervals collectively achieve a discontinuous receive duty cycle for the plurality of base stations in the service area.

17. A method of operation of a control node for a dense deployment of base stations in a cellular communication network comprising:

identifying, within the dense deployment of base stations, a plurality of base stations in a service area;

controlling the plurality of base stations in the service area such that a subset of the plurality of base stations in the service area are active during each of a plurality of discontinuous transmit active intervals for the plurality of base stations in the service area, and a subset of the plurality of base stations in the service area are active during each of a plurality of discontinuous receive active intervals for the plurality of base stations in the service area;

controlling the plurality of base stations in the service area such that different subsets of the plurality of base stations in the service area are active during different discontinuous transmit active intervals of the plurality of discontinuous transmit active intervals for the plurality of base stations in the service area, and different subsets of the plurality of base stations in the service area are active during different discontinuous receive active intervals of the plurality of discontinuous receive active intervals for the plurality of base stations in the service area;

controlling the plurality of base stations in the service area such that:

there are N different subsets of the plurality of base stations in the service area that are active during the different discontinuous transmit active intervals where subset i of the N different subsets is active every N-th discontinuous transmit active interval starting at an i-th discontinuous transmit active interval where i=1 . . . N; and there are M different subsets of the plurality of base stations in the service area that are active during the different discontinuous receive active intervals where subset j of the M different subsets is active every M-th discontinuous receive active interval starting at a j-th discontinuous receive active interval where j=1 . . . M.

18. A base station in a dense deployment of base stations comprising:

a transceiver comprising one or more radio units providing a wireless interface of the base station; and a processing subsystem configured to operate the one or more radio units in a discontinuous transmit and discontinuous receive mode of operation such that, when the base station is one of a plurality of base stations in the dense deployment of base stations that are identified as being within a service area, the base station is one of a subset of the plurality of base stations in the service area that are active during at least one of a plurality of discontinuous transmit active intervals for the plurality of base stations in the service area and one of a subset of the plurality of base stations in the service area that are active during at least one of a plurality of discontinuous receive active intervals for the plurality of base stations in the service area, wherein:

the base station is one base station in one of a plurality of different subsets of the plurality of base stations in the service area that are active during different discontinuous transmit active intervals of the plurality of discontinuous transmit active intervals for the plurality of base stations in the service area, and one base station in one of a plurality of different subsets of the plurality of base stations in the service area that are active during different discontinuous receive active intervals of the plurality of discontinuous receive active intervals for the plurality of base stations in the service area;

there are N different subsets of the plurality of base stations in the service area that are active during the different discontinuous transmit active intervals where the base station is in subset i of the N different subsets and the processing subsystem is further configured to control the one or more radio units such that the base station is active every N-th discontinuous transmit active interval starting at an i-th discontinuous transmit active interval where i=1 . . . N; and there are M different subsets of the plurality of base stations in the service area that are active during the different discontinuous receive active intervals where the base station is in subset j of the M different subsets and the processing subsystem is further configured to control the one or more radio units such that the base station is active every M-th discontinuous receive active interval starting at a j-th discontinuous receive active interval where j=1 . . . M.

19. The base station of claim 18 wherein the service area is a low-load service area.

20. The base station of claim 18 wherein the base station is one base station in the subset of the plurality of base station in the service area that is active during the plurality of discontinuous transmit active intervals for the plurality of base station in the service area is the same as the subset of the plurality of base station in the service area that is active during the plurality of discontinuous receive active intervals for the plurality of base station in the service area.

21. The base station of claim 20 wherein each of the subset of the plurality of base stations provides one or more basic services for an entirety of the service area.

22. The base station of claim 21 wherein each base station in the subset of the plurality of base stations has a discontinuous transmit duty cycle that is greater than a predefined minimum discontinuous transmit duty cycle and less than a predefined maximum discontinuous transmit duty cycle and a discontinuous receive duty cycle that is greater than a predefined minimum discontinuous receive duty cycle and less than a predefined maximum discontinuous receive duty cycle, and all other base stations of the plurality of base stations in the service area are completely inactive.

23. The base station of claim 18 wherein the plurality of different subsets of the plurality of base stations in the service area that are active during the different discontinuous transmit active intervals and the plurality of different subsets of the plurality of base stations in the service area that are active during the different discontinuous receive active intervals provide one or more basic services for an entirety of the service area.

24. The base station of claim 23 wherein each base station in each of the plurality of different subsets of the plurality of base stations in the service area that are active during the different discontinuous transmit active intervals has a discontinuous transmit duty cycle that is greater than a predefined minimum discontinuous transmit duty cycle and less than a predefined maximum discontinuous transmit duty cycle, each base station in each of the plurality of different subsets of the plurality of base stations in the service area that are active during the different discontinuous receive active intervals has a discontinuous receive duty cycle that is greater than a predefined minimum discontinuous receive duty cycle and less than a predefined maximum discontinuous receive duty cycle, and any other base stations of the plurality of base stations in the service area are completely inactive.

25. A method of operation of a base station in a dense deployment of base stations comprising:

operating one or more radio units of the base station in a discontinuous transmit and discontinuous receive mode of operation such that, when the base station is one of a plurality of base stations in the dense deployment of base stations that are identified as being within a service area, the base station is one of a subset of the plurality of base stations in the service area that are active during at least one of a plurality of discontinuous transmit active intervals for the plurality of base stations in the service area and one of a subset of the plurality of base stations in the service area that are active during at least one of a plurality of discontinuous receive active intervals for the plurality of base stations in the service area, wherein:

the base station is one base station in one of a plurality of different subsets of the plurality of base stations in the service area that are active during different discontinuous transmit active intervals of the plurality of discontinuous transmit active intervals for the plurality of base stations in the service area, and one base station in one of a plurality of different subsets of the plurality of base stations in the service area that are active during different discontinuous receive active intervals of the plurality of discontinuous receive active intervals for the plurality of base stations in the service area;

there are N different subsets of the plurality of base stations in the service area that are active during the different discontinuous transmit active intervals where the base station is in subset i of the N different subsets and the processing subsystem is further configured to control the one or more radio units such that the base station is active every N-th discontinuous transmit active interval starting at an i-th discontinuous transmit active interval where i=1 . . . N; and there are M different subsets of the plurality of base stations in the service area that are active during the different discontinuous receive active intervals where the base station is in subset j of the M different subsets and the processing subsystem is further configured to control the one or more radio units such that the base station is active every M-th discontinuous receive active interval starting at a j-th discontinuous receive active interval where j=1 . . . M.

* * * * *